(12) United States Patent
Liu et al.

(10) Patent No.: US 11,509,837 B2
(45) Date of Patent: Nov. 22, 2022

(54) CAMERA TRANSITION BLENDING

(71) Applicant: QUALCOMM Incorporated, San Diego, CA (US)

(72) Inventors: Weiliang Liu, San Diego, CA (US); Shizhong Liu, San Diego, CA (US); Tao Ma, San Diego, CA (US); Jianfeng Ren, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 17/009,285

(22) Filed: Sep. 1, 2020

(65) Prior Publication Data
US 2021/0360172 A1 Nov. 18, 2021

Related U.S. Application Data

(60) Provisional application No. 63/023,610, filed on May 12, 2020.

(51) Int. Cl.
*H04N 5/265* (2006.01)
*G06T 3/00* (2006.01)
(Continued)

(52) U.S. Cl.
CPC .......... *H04N 5/265* (2013.01); *G06T 3/0093* (2013.01); *H04N 5/23229* (2013.01);
(Continued)

(58) Field of Classification Search
CPC ............... H04N 5/2258; H04N 5/2259; H04N 5/23238; H04N 5/23296; H04N 5/23299; H04N 5/247; H04N 5/2628; H04N 5/265
See application file for complete search history.

(56) References Cited

U.S. PATENT DOCUMENTS 7,009,638 B2 3/2006 Gruber et al.
7,305,180 B2 12/2007 Labaziewicz et al.
(Continued)

FOREIGN PATENT DOCUMENTS

CN 105308947 A 2/2016
CN 106303258 A 1/2017
(Continued)

OTHER PUBLICATIONS

Atanassov K., et al., "Temporal Image Stacking for Noise Reduction and Dynamic Range Improvement", Proceedings Optical Diagnostics of Living Cells II, vol. 8667, Feb. 26, 2013, 86671P, 11 pages, XP055417957, ISSN: 0277-786X, DOI: 10.1117/12.2008559, ISBN: 978-1-5106-1354-6.
(Continued)

*Primary Examiner* — Paul M Berardesca
(74) *Attorney, Agent, or Firm* — Qualcomm Incorporated

(57) ABSTRACT

In general, techniques are described regarding initiating a recursive blending of a plurality of frames following a camera transition. One or more processors may, subsequent to a transition from a first camera mode to a second camera mode, blend one or more pixels of a first frame with one or more pixels of a second frame to produce a first blended frame, the first frame captured via a first camera, and the second frame captured via a second camera. The one or more processors may then output the first blended frame.

24 Claims, 12 Drawing Sheets

(51) Int. Cl.
*H04N 5/232* (2006.01)
*H04N 5/247* (2006.01)

(52) U.S. Cl.
CPC ..... *H04N 5/23241* (2013.01); *H04N 5/23245* (2013.01); *H04N 5/23296* (2013.01); *H04N 5/247* (2013.01)

(56) References Cited

U.S. PATENT DOCUMENTS

| | | | |
|---|---|---|---|
| 8,526,779 | B2 | 9/2013 | Simmons et al. |
| 8,664,579 | B2 | 3/2014 | Olsen et al. |
| 8,717,412 | B2 | 5/2014 | Linder et al. |
| 9,185,291 | B1 | 11/2015 | Shabtay et al. |
| 10,297,034 | B2 | 5/2019 | Nash et al. |
| 2008/0030592 | A1 | 2/2008 | Border et al. |
| 2008/0218613 | A1 | 9/2008 | Janson et al. |
| 2009/0073254 | A1 | 3/2009 | Li et al. |
| 2012/0026366 | A1 | 2/2012 | Golan et al. |
| 2013/0169834 | A1 | 7/2013 | Herz et al. |
| 2014/0168444 | A1 | 6/2014 | Bae et al. |
| 2015/0085174 | A1 | 3/2015 | Shabtay et al. |
| 2015/0145950 | A1 | 5/2015 | Murphy et al. |
| 2016/0309095 | A1 | 10/2016 | Laroia et al. |
| 2017/0041553 | A1 | 2/2017 | Cao et al. |
| 2017/0230585 | A1 | 8/2017 | Nash et al. |
| 2018/0096487 | A1 | 4/2018 | Nash et al. |
| 2018/0183982 | A1 | 6/2018 | Lee et al. |
| 2018/0278884 | A1 | 9/2018 | Abe |
| 2018/0315156 | A1 | 11/2018 | Shin |
| 2019/0122349 | A1 | 4/2019 | Cohen et al. |
| 2019/0236794 | A1 | 8/2019 | Nash et al. |
| 2020/0120284 | A1* | 4/2020 | Kini ............ G02B 15/14 |

FOREIGN PATENT DOCUMENTS

| | | |
|---|---|---|
| WO | 2012024830 A1 | 3/2012 |
| WO | 2014199338 A2 | 12/2014 |

OTHER PUBLICATIONS

Co-pending U.S. Appl. No. 16/667,662, inventor Liu; Shizhong, filed Oct. 29, 2019.

Kahraman F., et al., "Image Frame Fusion Using 3D Anisotropic Diffusion", 23rd International Symposium on Computer and Information Sciences, Oct. 27, 2008, pp. 1-6, XP031375516.

Kumar B.K.S., "Image Fusion Based on Pixel Significance Using Cross Bilateral Filter", Signal, Image and Video Processing, vol. 9, No. 5, Oct. 5, 2013, pp. 1193-1204, XP055330239, ISSN: 1863-1703, DOI: 10.1007/s11760-013-0556-9.

Li S., et al., "Image Fusion With Guided Filtering", IEEE Transactions on Image Processing, vol. 22, No. 7, Jul. 1, 2013, pp. 2864-2875, XP011510936, ISSN: 1057-7149, DOI: 10.1109/TIP.2013.2244222.

Zitova B., et al., "Image registration methods: a survey," Image and Vision Computing, Oct. 2003, vol. 21, No. 11, pp. 977-1000.

International Search Report and Written Opinion—PCT/US2021/027278—ISA/EPO—Jul. 1, 2021.

Kylmamaa M., "Creating a Post-Processing Framework: Tips & Tricks", Internet Citation, Oct. 3, 2006 (Oct. 3, 2006), XP001543462, Retrieved from the Internet: URL: http://gamasutra.com/features/20061003/kylmamaa_01.shtml.

Weickert J., et al., "Theoretical Foundations of Anisotropic Diffusion in Image Processing", Computing Suppement 11, 221-236, Computing Supplement, 11. 10.1007/978-3-7091-6586-7_13, (Year: 2002). (Applicant points out, in accordance with MPEP 609.04(a), that the year of publication, 2002, is sufficiently earlier than the effective U.S. filing date, so that the particular month of publication is not in issue.).

* cited by examiner

CAMERA TRANSITION BLENDING

This application claims the benefit of U.S. Provisional Patent Application No. 63/023,610, filed May 12, 2020, the entirety of which is hereby incorporated by reference.

TECHNICAL FIELD

The disclosure relates to image processing.

BACKGROUND

Image capture devices are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any devices with digital imaging or video capabilities.

Certain image capture devices include multiple image sensors that capture image data through one or more lenses, and in turn, transfer the image data to a camera processor. An image capture device may include multiple lenses used in conjunction with multiple image sensors so as to capture images at many different zoom levels. Example lens types include wide-angle lenses, ultra-wide-angle lenses, telephoto lenses, telescope lenses, periscope-style zoom lenses, fisheye lenses, macro lenses, prime lenses, or various combinations thereof. In an example, a dual camera configuration may include both a wide lens and a telephoto lens. Similarly, a triple camera configuration may include an ultra-wide lens, a wide lens, and a telephoto lens.

SUMMARY

In general, this disclosure describes image processing techniques involving digital cameras having image sensors and camera processors. Particularly, a camera processor may be configured to perform various frame blending operations (e.g., pixel blending) in response to a transition between cameras. The cameras may include multiple cameras of, or otherwise coupled to, a computing device, such as a stand-alone image capture device, camera-equipped computer device, wireless communication device, etc. The computing device may include one or more camera processors, such as an image signal processor (ISP) that, in turn, may include one or more image processing engines (IPE) that control various signal processing pipeline operations.

The camera processor may be configured to obtain input frames of image data (e.g., pixel values) from the different cameras, and in turn, produce corresponding output frames of the image data (e.g., preview display frames, still-image captures, frames for video, etc.). The camera processor may output frames of the image data to various output devices and/or camera modules for further processing, such as for 3A parameter synchronization, producing a video file via the output frames, configuring frames for display, configuring frames for storage, etc. That is, a camera processor may obtain incoming frames from one or more image sensors, each coupled to one or more camera lenses, and, in turn, may produce and output a flow of output frames to various output destinations. In such examples, the camera processor may be configured to produce a flow of output frames that may dynamically represent changing zoom levels (e.g., increasing or decreasing zoom levels). In an example, the camera processor may receive input to change zoom levels based on pinch-to-zoom operations, gesture detections, etc.

In order to achieve various zoom levels, the camera processor may, in some instances, initiate a transition between one camera to another camera based on a zoom level command. The different cameras may have different lenses, such as a first camera prior to a camera transition that utilizes a wide-angle lens and a second camera following the camera transition that utilizes a telephoto lens. The camera processor may initiate the camera transition according to various camera transition operations, including, but not limited to, lens transitions, image sensor transitions, moving prism actuations, camera module transitions, etc.

In an example, the camera processor may transition from a first camera to a second camera in response to detecting that a particular zoom level has satisfied a camera transition threshold. When implementing such camera transitions, such as during a zoom operation, a camera processor may effectively obtain a first set of input frames from a first camera prior to a camera transition and a second set of input frames from another camera following the camera transition. The camera processor may, in turn, be configured to produce a single flow of output frames, based on respective output frames associated with each camera. Due to various differences between cameras, however, frames obtained from each camera may, nevertheless, flow together in such a way that the transition is perceptible to the human eye, such as in a resulting video or in a preview display. In addition, when processed as a single output flow in accordance with a particular zoom command, the frames obtained from different cameras may ultimately result in a relatively inefficient, imprecise, and/or inaccurate image processing operation, such as in terms of qualitative differences between input frames, output frames, and/or resulting video and/or display frames.

The aforementioned problems, among others, may be addressed by the disclosed techniques for blending pixels of a frame obtained from one camera following a camera transition with a frame previously obtained from a second camera prior to the camera transition. That is, the camera processor may blend an input frame that precedes the camera transition with an input frame that follows the camera transition. The camera processor may perform such blending based on a blending weight that represents particular pixel contribution levels. That is, the blending weight may indicate both a proportion of which a current frame is to contribute to a blended frame and the proportion to which a previous frame is to contribute to the blended frame.

In some examples, a camera processor may geometrically warp the last frames obtained from a first camera in anticipation of a camera transition. That is, the camera processor may warp frames obtained from a first camera prior to a camera transition to align pixels of the warped frame with pixel coordinates of a first anticipated input frame obtained from a second camera following the camera transition. In blending the last frame (e.g., a geometrically warped frame) obtained from the first camera with subsequent frames obtained from the second camera, the camera processor may blend pixels of the last frame with pixels of a subsequent frame obtained following the camera transition. By initiating the blending process in response to the camera transition, the camera processor may advantageously minimize the amount of memory utilized in performing the transition blending process while providing various qualitative benefits that result from pixel blending following a camera transition.

In an example, a first input frame and a second input frame may contribute, in some instances, a different yet corresponding amount (e.g., proportional or inverse amounts) to produce a first blended output frame following a camera transition, such that the output frame represents pixels from various input frames. The input frames may contribute a blend of pixels that correspond to a blending weight. In addition, the camera processor may blend the first blended frame that entered the output flow following the camera transition with a subsequent input frame obtained from the second camera, and this process may continue recursively for a predetermined amount of time, or in some instances, until a predetermined number of frames following the camera transition have been obtained or otherwise, until the pixel contribution of the input frame obtained from the first camera has diminished throughout the recursive blending that follows the camera transition to satisfy a predefined threshold.

In accordance with one or more of the various techniques of this disclosure, a difference in various qualitative metrics (e.g., photometric characteristics, tone, color, contrast, etc.) may blend across frames obtained between cameras in a relatively efficient manner. This is because for a finite number of frames following a camera transition, each input frame is blended recursively with an input frame obtained from the first camera. In addition, while a finite number of input frames obtained from the second camera may differ from the corresponding output frames due to the blending of pixels with an input frame obtained from the first camera, the input frames from the first camera may not differ significantly from corresponding output frames prior to the camera transition. Instead, the camera processor may perform a geometrical warping phase that is decoupled from the blending phase, where the blending phase follows the camera transition. In such examples, the blending phase may include a pixel level blending of two input frames or of a blended frame and an unblended frame that blends pixels at the local pixel level. Advantageously, the blending phase starts at the moment of transition between cameras so as to consume less processing power and/or other resources when a proper blending transition may occur based on the input frame obtained from the first camera.

Additional advantages to this process include efficiency, precision, and/or accuracy in various video coding processes in that the frames that are output to a video coder prior to the camera transition may include pixel values that flow in a relatively predictable manner, to a first blended frame that follows the camera transition. That is, a video coder may tend to more accurately perform temporal prediction techniques (e.g., compressing or decompressing P-frames and B-frames in a video coding standard) when, for example, tone, color, and/or contrast information between pixels of output frames, such as a geometrically warped frame and an input frame obtained from a second camera, do not include abrupt changes in photometric details. As such, an input frame obtained last prior to a camera transition (e.g., a last geometrically warped frame) may be advantageously blended with a frame input frame obtained from a second camera following the camera transition, as well as recursively blended with subsequent input frames obtained from the second camera, in such a way that certain qualitative metrics (e.g., photometric details) can be efficiently retained in response to a camera transition and in such a way that the occurrence of the camera transition may not be readily perceivable to an end-user.

In one example, the techniques of the disclosure are directed to an apparatus configured for camera processing, the apparatus comprising: a memory, and one or more processors in communication with the memory, the one or more processors configured to: receive a signal to transition from a first mode to a second mode, wherein a first frame is received via a first camera of the apparatus when the apparatus is operating in the first mode, and wherein a second frame is received via a second camera of the apparatus when the apparatus is operating in the second mode; transition from the first mode to the second mode; subsequent to the transition, blend one or more pixels of a first frame with one or more pixels of a second frame to produce a first blended frame; and output the first blended frame after the first frame.

In another example, the techniques of the disclosure are directed to a method for camera processing, the method comprising: receiving a signal to transition from a first mode to a second mode, wherein a first frame is received via a first camera configured to operate pursuant to the first mode, and wherein a second frame is received via a second camera configured to operate pursuant to the second mode; transitioning from the first mode to the second mode; subsequent to transitioning from the first mode to the second mode, blending one or more pixels of a first frame with one or more pixels of a second frame to produce one or more blended pixels of a first blended frame; and outputting the first blended frame after the first frame.

In another example, the techniques of the disclosure are directed to an apparatus configured for camera processing, the apparatus comprising: means for determining to transition from a first camera mode to a second camera mode, wherein the first camera mode includes a mode in which a first frame is received via a first camera, and wherein the second camera mode includes a mode in which a second frame is received via a second camera; means for transitioning from the first camera mode to the second camera mode; means for blending, subsequent to a transition from a first camera mode to a second camera mode, a first set of pixels of a first frame with a second set of pixels of a second frame to produce a first blended frame; and means for outputting the first blended frame In another example, the techniques are directed to an apparatus configured for camera processing, the apparatus comprising: means for blending, in response to a camera transition from a first camera to a second camera, pixels of a first frame with pixels of a second frame to produce a first blended frame; means for obtaining a third frame via the second camera; and means for blending the first blended frame with the third frame.

In another example, the techniques of the disclosure are directed to a non-transitory computer-readable storage medium having stored thereon instructions that, when executed, cause one or more processors to: transition from a first camera mode to a second camera mode, wherein a first frame is received by the one or more processors when the one or more processors are operating pursuant to the first camera mode, and wherein a second frame and a third frame are received by the one or more processors when the one or more processors are operating pursuant to the second camera mode, wherein the first camera mode and the second camera mode are different from one another; blend, in response to the transition, one or more pixels of a first frame with one or more pixels of a second frame to produce a first blended frame comprising one or more blended pixels; and blend the one or more blended pixels of the first blended frame with one or more pixels of the third frame to produce a second blended frame.

The details of one or more examples are set forth in the accompanying drawings and the description below. Other features, objects, and advantages will be apparent from the description, drawings, and claims.

DETAILED DESCRIPTION

Figure 1:
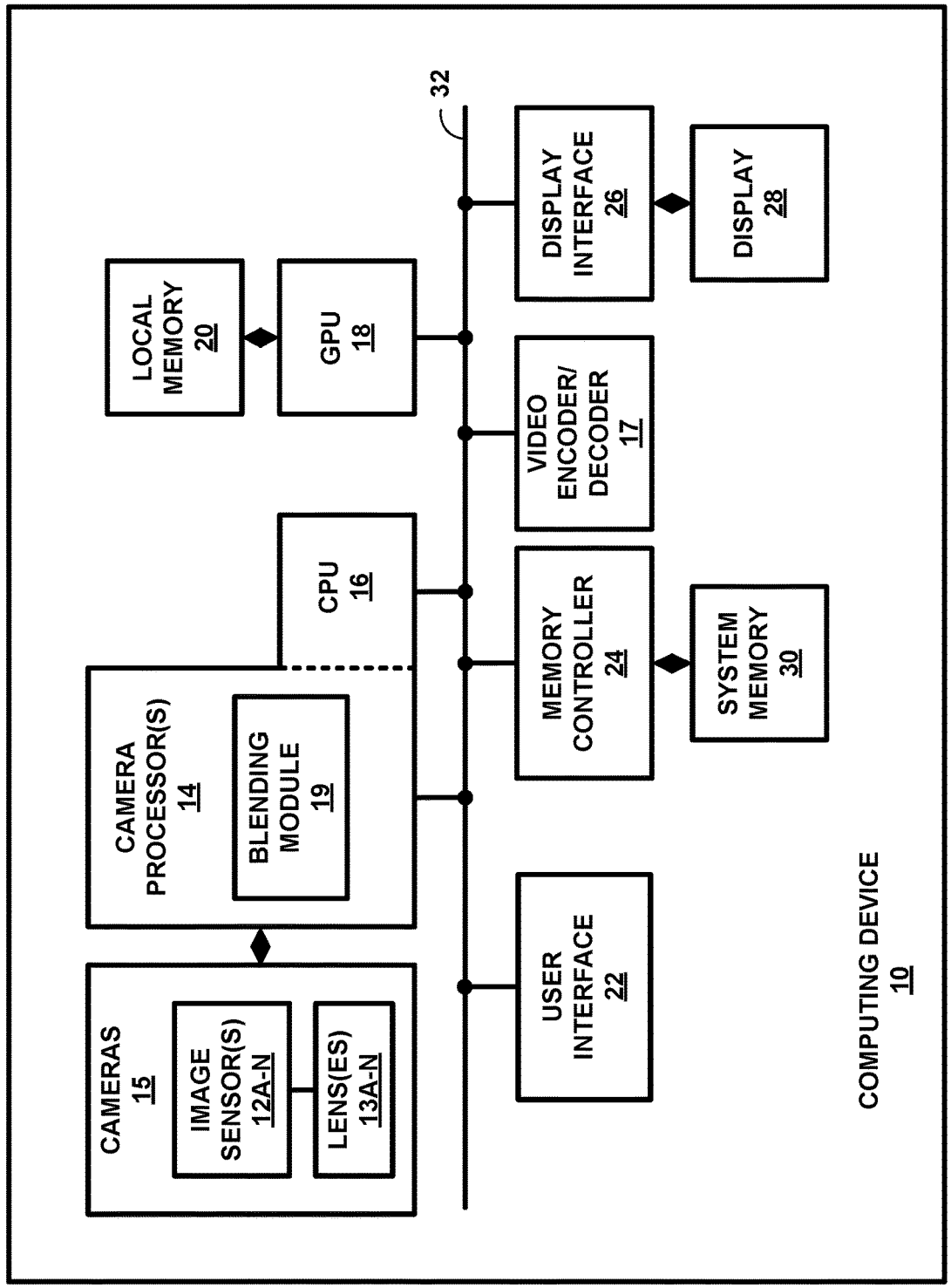
FIG. 1 is a block diagram of a computing device configured to perform one or more of the example techniques described in this disclosure.

A camera, including camera processor(s) and image sensors, may capture frames of image data using the one or more image sensors. The camera may output captured frames, including pixel information defining the frame, to the camera processor(s) for processing. Among other processing techniques employed, the camera processor(s) may perform various lens and/or image sensor transition techniques under various circumstances upon receiving the image data in order to transition effectively between lenses and sensors of a multi-lens and/or multi-sensor image capture device. In an example, the camera processor(s) may initiate or otherwise cause a transition from a first camera having a first field of view (FOV) and/or a first focal length to a second different camera having a second FOV and/or a second focal length. In an illustrative example, the first camera may include a wide-angle camera and the second camera may include a telephoto camera. While various examples are described herein with reference to particular camera types and/or particular zoom operations (e.g., zoom-in), the techniques of this disclosure are not so limited, and the techniques may apply to any number of different camera combinations (e.g., triple camera configurations) or zoom operations.

In one example, a camera processor may, in response to a camera transition from a first camera to a second camera, initiate a transition blending process. As such, the camera processor may blend of pixels of a first frame with pixels of a second frame to produce a first blended frame. In such instances, the first frame may be obtained from the first camera and the second frame may be obtained from a second camera. In addition, the second frame may be obtained following the first frame and after a transition to the second camera. Similarly, the first frame may be obtained prior to the second frame and prior to a transition from the first camera to the second camera. In some examples, the first frame may include a last frame of a geometrical warping process that immediately precedes the effective switching point between cameras. In an illustrative example, a camera processor may geometrically warp the last frame and a penultimate frame obtained from a first camera prior to a transition to the second camera.

In some examples, the camera processor may output the first blended frame in succession with the first frame obtained from the first camera. In such examples, the camera processor may produce output frames that represent a transition in pixel values across frames that, for example, result in unabrupt transitions between photometric qualities of various output frames obtained from input frames before and after the camera transition. Otherwise, an abrupt transition between output frames on either side of a camera transition may become apparent to an end-user or in another example, may lead to abnormalities to manifest during an example video coding process. That is, transitions between different cameras may result in a mismatch between various qualitative characteristics when comparing a frame obtained from a first camera immediately prior to an automatic camera transition and a frame obtained from a second camera immediately after the camera transition.

In an illustrative and non-limiting example, the camera transition may result in a mismatch between certain photometric qualities represented by pixels of a first set of output frames capturing a particular scene when compared to corresponding photometric qualities represented by pixels of a second set of output frames capturing the same scene. This mismatch caused by a transition between different cameras may be, in some instances, be based on differences between image sensors manufactured by different manufacturers, but in any case, may be undesirable for a number of different reasons. Such differences between output frames may, for instance, become amplified at increasingly higher camera resolutions and/or at higher display resolutions. That is, abrupt transitions may ultimately result in an overall negative experience with camera transitions that initiate in response to changes in zoom levels, where such zoom levels may have otherwise been desirable from the perspective of the user.

The aforementioned problems, among others, may be addressed by the disclosed techniques for smoothing a transition between camera transitions by recursively blending input frames obtained from a second camera with an input frame obtained from a first camera. Specifically, the frame blending operations may initiate in response to a camera transition. That is, the frame blending operations may initiate at the camera transition. The camera processor may produce a blended frame as a first output frame following the camera transition. In an example, a camera processor may obtain the blended frame by blending pixels of a last input frame obtained prior to the camera transition with pixels of a first input frame obtained after the camera transition. In some examples, the input frame may include a geometrically warped frame that the camera processor warps in anticipation of a transition between cameras in order to align the input frames during a geometrical warping phase that precedes the camera transition. In any case, the camera processor may blend pixels of an input frame that precedes the camera transition with an input frame that follows the camera transition. The camera processor may perform such blending based on a pixel contribution level that represents a blending weight determining how much the first input frame and how much the second input frame will contribute to a first blended frame following the camera transition.

In another example, output frames preceding a camera transition may represent input frames obtained from a first camera and geometrically warped to compensate for differences between a first camera and a second camera. In some examples, camera processor(s) may perform the warping operation by geometrically displacing various pixels in the frame so as to properly align with frames of another camera, such as when inversely warped for display, output to memory, output to a video coder, when received by a video coder, etc. Prior to outputting the geometrically warped frame as an output frame or in some instances after, the geometrically warped frame may be blended with the input frame obtained from the second camera following the camera transition.

In an illustrative example, the first blended frame has corresponding contribution levels of pixels from the first frame and pixels from the second frame (e.g., 90% and 10%, 80% and 20%, 70% and 30%, 60% and 40%, 50% and 50%, 40% and 60%, 30% and 70%, 20% and 80%, 10% and 90%, etc.). In some examples, the blending weight coefficient 33 may result in essentially no blending following the camera transition, such as by including a value of less than 0.1 (e.g., 0.5%, 0.01%, 0.00%, etc.). In such instances, a value of 0 (e.g., 0%) may be representative of a hard transition (e.g., no smooth transition). In general, however, a blending weight coefficient of between 0.5 and 0.8, as an example, results in one or more camera processor(s) performing a blending transition that provides a cascading of pixel values throughout that recursively blend with subsequent frames in such a way that the transition between a first camera (e.g., a first lens and image sensor combination) and a second camera (e.g., a second lens and image sensor combination) is less noticeable or not noticeable at all from the perspective of an end-user and/or effectively mitigates extraneous drains on power, processing, and/or memory resources.

In addition, the first blended frame may be blended with a subsequent input frame obtained from the second camera, such that the previous frame obtained from the first camera may be recursively blended with each subsequent frame in diminishing or decaying pixel contribution levels. That is, the camera processor may apply a blending weight that determines the contribution levels for blending frames in a recursive fashion over time. In an example, pixels of the first frame may represent a 20% contribution level to the first blended frame while the second frame may represent an 80% contribution level to the first blended frame. With a third input frame, pixels of the third frame may represent an 80% contribution level to a second blended frame while the first blended frame may represent a 20% contribution level to the second blended frame. That is, the first frame obtained from the first camera represents a 4% contribution level that, due to a blending function and the blending weight, may continue to cascade and further diminish throughout the transition blending process.

FIG. 1 is a block diagram of a computing device 10 configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, or any device that may include one or more cameras. In some examples, computing device 10 may include a central processing unit (CPU) 16, a video encoder/decoder 17, a graphics processing unit (GPU) 18, local memory 20 of GPU 18, user interface 22, memory controller 24 that provides access to system memory 30, and display interface 26 that outputs signals that cause graphical data to be displayed on display 28.

As illustrated in the example of FIG. 1, computing device 10 includes one or more image sensor(s) 12A-N. Image sensor(s) 12A-N may be referred to in some instances herein simply as "sensor 12," while in other instances may be referred to as a plurality of "sensors 12" where appropriate. Computing device 10 further includes one or more lens(es) 13A-N and camera processor(s) 14. Similarly, lens(es) 13A-N may be referred to in some instances herein simply as "lens 13," while in other instances may be referred to as a plurality of "lenses 13" where appropriate. In some examples, sensor(s) 12 represent one or more image sensors 12 that may each include processing circuitry, an array of pixel sensors (e.g., pixels) for capturing representations of light, memory, such as buffer memory or on-chip sensor memory, etc.

As shown in FIG. 1, computing device 10 includes multiple cameras 15. As used herein, the term "camera" refers to a particular image sensor 12 of computing device 10, or a plurality of image sensors 12 of computing device 10, where the image sensor(s) 12 are arranged in combination with one or more lens(es) 13 of computing device 10. That is, a first camera 15 of computing device 10 refers to a first collective device that includes one or more image sensor(s) 12 and one or more lens(es) 13, and a second camera 15, separate from the first camera 15, refers to a second collective device that includes one or more image sensor(s) 12 and one or more lens(es) 13. In addition, image data may be received from image sensor(s) 12 of a particular camera 15 by camera processor(s) 14 or CPU 16. That is, camera processor(s) 14 or CPU 16 may, in some examples, receive a first set of frames of image data from a first image sensor 12 of a first camera 15 and receive a second set of frames of image data from a second image sensor 12 of a second camera 15.

In an example, the term "camera" as used herein refers to a combined image sensor 12 and lens 13 that, coupled together, are configured to capture at least one frame of image data and transfer the at least one frame of the image data to camera processor(s) 14 and/or CPU 16. In an illustrative example, a first camera 15 is configured to transfer a first frame of image data to camera processor(s) 14 and a second camera 15 is configured to transfer a second frame of image data to camera processor(s) 14, where the two frames are captured by different cameras as may be evidenced, for example, by the difference in field of view between the first frame and the second frame. The difference in field of view may correspond to a difference in focal length between the first camera 15 and the second camera 15. In such examples, camera processor(s) 14 or CPU 16 may cause a transition from first camera 15 to second camera 15 (e.g., in response to a changing zoom level) by initiating a blending transition process in accordance with one or more of the various techniques of this disclosure.

In an example, camera processor(s) 14 may receive the first frame and the second frame from two different cameras 15 and may then blend the first frame with the second frame to produce a first blended frame following a switch from first camera 15 to second camera 15 as the primary camera for generating content for sending from camera processor(s) 14 to one or more of display interface 26, system memory 30, and/or video encoder/decoder 17. In some examples, camera processor(s) 14 may cause a shift in power usage between the first camera 15 and the second camera 15 to effectuate the switch. That is, second camera 15 may increase power usage via a particular lens 13 and image sensor 12 combination corresponding to second camera 15, and first camera 15 may decrease power usage consumed via a particular lens 13 and image sensor 12 combination corresponding to first camera 15.

In an illustrative example, multiple different cameras 15 may be included with a single computing device 10 (e.g., a mobile phone having one or more front facing cameras and one or more rear facing cameras). In some examples, one computing device 10 may include a first camera 15 having one or more image sensors 12 and one or more lenses 13 and a second camera 15 having one or more image sensors 12 and one or more lenses 13. The first camera 15 may have a first focal length that is a product of the particular combination of lens(es) 13 and sensor(s) 12 employed as first camera 15, and the second camera 15 may have a second focal length that is a product of the particular combination of lens(es) 13 and sensor(s) 12 employed as second camera 15. In an example, camera processor(s) 14 may transition from a first camera 15 to a second camera 15, and in response to the transition, camera processor(s) 14 may blend a frame obtained from first camera 15 with a subsequent frame obtained from second camera 15.

While some example techniques are described herein with respect to a single sensor 12, the example techniques are not so limited, and may be applicable to various camera types used for capturing images/videos, including devices that include multiple image sensors and/or multiple lens types. For example, computing device 10 may include dual lens devices, triple lens devices, 360-degree camera lens devices, etc. As such, each lens 13 and image sensor 12 combination may provide various zoom levels, angles of view (AOV), focal lengths, fields of view (FOV), etc. In some examples, particular image sensors 12 may be allocated for each lens 13, and vice versa. For example, multiple image sensors 12 may be each allocated to different lens types (e.g., wide lens, ultra-wide lens, telephoto lens, and/or periscope lens, etc.).

In examples including multiple lenses 13, CPU 16 and/or camera processor(s) 14 may activate particular lenses 13, or combinations of lenses 13, in response to receiving user input (e.g., via user interface 22). For example, CPU 16 and/or camera processor(s) 14 may receive user input via user interface 22 that includes zoom settings (e.g., user selection of a particular lens 13 (e.g., a fisheye lens camera), a zoom command, etc.). In another example, camera processor(s) 14 may receive zoom settings irrespective of user interface 22, such as from system memory 30 or CPU 16. In one example, camera processor(s) 14 may receive zoom settings via user interface 22 and may also retrieve preprogrammed zoom settings from system memory 30. In such examples, camera processor(s) 14 may use either zoom settings individually, or in some instances, may combine zoom settings received from different sources.

In some examples, CPU 16 may automatically determine which lens 13 to activate and either select an initial lens 13 to activate or transition from one lens 13 to another lens 13. For example, CPU 16 and/or camera processor(s) 14 may determine which lens 13 to activate upon detecting an operating condition that satisfies certain lens-selection criteria (e.g., zoom level satisfying a predefined camera transition threshold, a change in lighting conditions, input from a user calling for a particular lens 13, etc.). In some examples, multiple cameras may be used in conjunction with one another to capture one synthetic image (e.g., panoramic image).

In some examples, camera processor(s) 14 may cause an adjustment to an effective focal length of one or more lenses 13 and one or more image sensors 12. For example, camera processor(s) 14 may initiate a lens actuator that moves lens 13 toward or away from a respective image sensor 12. In another example, camera processor(s) 14 may initiate a lens transition from a first lens 13A to a second lens 13B. In any event, camera processor(s) 14 may adjust the focal length at which a frame of image data is captured via lenses 13 and image sensors 12. Camera processor(s) 14 may perform such adjustments in response to a zoom setting (e.g., a zoom command, automatic zoom programming, zoom level input, zoom transition, etc.). In some examples, camera processor(s) may perform such adjustments while performing various auto focus techniques.

In some examples, a single image sensor 12 may correspond to multiple lenses 13. In such examples, light guides may be used to direct light incident on lenses 13 to respective image sensor(s) 12. An example light guide may include a prism, a moving prism, mirrors, etc. In this way, light received from a single lens may be redirected to a particular sensor 12, such as away from one sensor 12 and toward another sensor 12. For example, camera processor(s) 14 may cause a prism to move and redirect light incident on one of lenses 13 in order to effectively change the focal length.

Although the various structures of computing device 10 are illustrated as separate in FIG. 1, the techniques of this disclosure are not so limited, and in some examples the structures may be combined to form a system on chip (SoC). As an example, camera processor(s) 14, CPU 16, GPU 18, and display interface 26 may be formed on a common integrated circuit (IC) chip. In some examples, one or more of camera processor(s) 14, CPU 16, GPU 18, and display interface 26 may be formed on separate IC chips. Various other permutations and combinations are possible, and the techniques of this disclosure should not be considered limited to the example illustrated in FIG. 1. In an example, CPU 16 may include camera processor(s) 14 such that one or more of camera processor(s) 14 are part of CPU 16. In such examples, CPU 16 may be configured to perform one or more of the various techniques otherwise ascribed herein to camera processor(s) 14. For purposes of this disclosure, camera processor(s) 14 will be described herein as being separate and distinct from CPU 16, although this may not always be the case.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different structures shown in FIG. 1 is merely exemplary, and other configurations of computing devices and/or other image processing systems with the same or different structures may be used to implement the techniques of this disclosure.

In addition, the various components illustrated in FIG. 1 (whether formed on one device or different devices), including sensor(s) 12 and camera processor(s) 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. In addition, examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

In some examples, memory controller 24 may facilitate the transfer of data going into and out of system memory 30. For example, memory controller 24 may receive memory read and write commands, and service such commands with respect to memory 30 in order to provide memory services for various components of computing device 10. In such examples, memory controller 24 may be communicatively coupled to system memory 30. Although memory controller 24 is illustrated in the example of computing device 10 of FIG. 1 as being a processing circuit that is separate from both CPU 16 and system memory 30, in some examples, some or all of the functionality of memory controller 24 may be implemented on one or more of CPU 16, system memory 30, camera processor(s) 14, video encoder/decoder 17, and/or GPU 18.

System memory 30 may store program modules and/or instructions and/or data that are accessible by camera processor(s) 14, CPU 16, and/or GPU 18. For example, system memory 30 may store user applications (e.g., instructions for a camera application), resulting images from camera processor(s) 14, etc. System memory 30 may additionally store information for use by and/or generated by other components of computing device 10. For example, system memory 30 may act as a device memory for camera processor(s) 14. System memory 30 may include one or more volatile or non-volatile memories or storage devices, such as, for example, RAM, SRAM, DRAM, ROM, EPROM, EEPROM, flash memory, a magnetic data media or an optical storage media. In addition, system memory 30 may store image data (e.g., frames of video data, encoded video data, zoom settings, 3A parameters, etc.). In some examples, system memory 30 or local memory 20 may store the image data to on-chip memory, such as in a memory buffer of system memory 30 or local memory 20. In another example, system memory 30 or local memory 20 may output image data in order to be stored external from the memory of a chip or buffer, such as to a secure digital (SD™) card of a camera device or in some instances, to another internal storage of a camera device. In an illustrative example, system memory 30 or local memory 20 may be embodied as buffer memory on a camera processor 14 chip, GPU 18 chip, or both where a single chip includes both processing circuitries.

In some examples, system memory 30 may include instructions that cause camera processor(s) 14, CPU 16, GPU 18, and/or display interface 26 to perform the functions ascribed to these components in this disclosure. Accordingly, system memory 30 may be a computer-readable storage medium having instructions stored thereon that, when executed, cause one or more processors (e.g., camera processor(s) 14, CPU 16, GPU 18, and display interface 26) to perform the various techniques of this disclosure.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

In addition, camera processor(s) 14, CPU 16, and GPU 18 may store image data, user interface data, etc., in respective buffers that are allocated within system memory 30. Display interface 26 may retrieve the data from system memory 30 and configure display 28 to display the image represented by the image data, such as via a user interface 22 screen. In some examples, display interface 26 may include a digital-to-analog converter (DAC) that is configured to convert digital values retrieved from system memory 30 into an analog signal consumable by display 28. In other examples, display interface 26 may pass the digital values directly to display 28 for processing.

In some examples, camera processor(s) 14 may comprise an image signal processor (ISP). For instance, camera processor(s) 14 may include a camera interface that interfaces between sensor(s) 12 and camera processor(s) 14. Camera processor(s) 14 may include additional circuitry to process the image content. Camera processor(s) 14 may be configured to perform various operations on image data captured by sensor 12, including auto white balance, color correction, or other post-processing operations. In some examples, camera processor(s) 14 may execute "3A" algorithms. Such algorithms may include autofocus (AF), auto exposure control (AEC), and auto white balance (AWB) techniques. In such examples, 3A may represent the functionality of a statistics algorithm processing engine, where one of camera processor(s) 14 may implement and operate such a processing engine.

In some examples, camera processor(s) 14 are configured to receive image frames (e.g., pixel data) from sensor(s) 12, and process the image frames to generate image and/or video content. For example, image sensor(s) 12 may be configured to capture individual frames, frame bursts, frame sequences for generating video content, photo stills captured while recording video, preview frames, or motion photos from before and/or after capture of a still photograph. CPU 16, GPU 18, camera processor(s) 14, or some other circuitry may be configured to process the image and/or video content captured by sensor(s) 12 into images or video for display on display 28. Image frames may generally refer to frames of data for a still image or frames of video data or combinations thereof, such as with motion photos. Camera processor(s) 14 may receive from sensor(s) 12 pixel data of the image frames in any format. For example, the pixel data may include different color formats, such as RGB, YCbCr, YUV, etc. In any case, camera processor(s) 14 may receive, from image sensor(s) 12, a plurality of frames of image data.

In examples including multiple camera processor(s) 14, camera processor(s) 14 may share sensor(s) 12, where each of camera processor(s) 14 may interface with each of sensor(s) 12. In any event, camera processor(s) 14 may initiate capture of a video or image of a scene using a plurality of pixel sensors of sensor(s) 12. In some examples, a video may include a sequence of individual frames. As such, camera processor(s) 14 causes sensor(s) 12 to capture the image using the plurality of pixel sensors. Sensor(s) 12 may then output pixel information to camera processor(s) 14 (e.g., pixel values, luma values, color values, charge values, Analog-to-Digital Units (ADU) values, etc.), the pixel information representing the captured image or sequence of captured images. In some examples, camera processor(s) 14 may process monochrome and/or color images to obtain an enhanced color image of a scene. In some examples, camera processor(s) 14 may determine universal blending weight coefficient(s) 33 for different types of pixel blending or may determine different blending weight coefficient(s) 33 for blending different types of pixels that make up a frame of pixels (e.g., a first blending weight coefficient 33 for blending pixels obtained via a monochrome sensor of first camera 15 and pixels obtained via a monochrome sensor of second camera 15, a second blending weight coefficient 33 for blending pixels obtained via a Bayer sensor of first camera 15 and pixels obtained via a Bayer sensor of second camera 15, etc.).

Computing device 10 may include a video encoder and/or video decoder 17, either of which may be integrated as part of a combined video encoder/decoder (CODEC) (e.g., a video coder). Video encoder/decoder 17 may include a video coder that encodes video captured by one or more camera(s) 15 or a decoder that can decode compressed or encoded video data. In some instances, CPU 16 and/or camera processor(s) 14 may be configured to encode and/or decode video data, in which case, CPU 16 and/or camera processor(s) 14 may include video encoder/decoder 17. In any case, video encoder/decoder 17 may be configured to compress or decompress full or at least partially full potential FOV frames of image data received from image sensor(s) 12 (e.g., the plurality of captured frames). Similarly, video encoder/decoder 17 may be configured to compress or decompress output frames (e.g., blended frames, unblended frames, etc.). In some examples, video encoder/decoder 17 may be further configured to compress or decompress preview frames that represent zoom settings (e.g., the first set of zooming frames generated according to the first set of zoom settings), zoom setting information, etc.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a camera application, a graphics editing application, a media player application, a video game application, a graphical user interface application or another program. For example, a camera application may allow the user to control various settings of camera 15. The user may provide input to computing device 10 via one or more input devices (not shown) such as a keyboard, a mouse, a microphone, a touch pad or another input device that is coupled to computing device 10 via user interface 22. In some examples, user interface 22 may provide various methods of adjusting blending weights for blending frames.

One example software application is a camera application. CPU 16 executes the camera application, and in response, the camera application causes CPU 16 to generate content that display 28 outputs. For instance, display 28 may output information such as light intensity, whether flash is enabled, and other such information. The camera application may also cause CPU 16 to instruct camera processor(s) 14 to process the images captured by sensor 12 in a user-defined manner. The user of computing device 10 may interface with display 28 (e.g., via user interface 22) to configure the manner in which the images are generated (e.g., with zoom settings applied, with or without flash, focus settings, exposure settings, video or still images, and other parameters). For example, CPU 16 may receive via user interface 22 a zoom setting that commands a zoom level to increase to a camera transition threshold. In addition, CPU 16 may receive, via user interface 22, values for blending weight coefficients that blending module 19 may receive and use to blend pixels of frames, such as recursively following a camera transition. In addition, camera processor(s) 14 via IPE(s) 42 may perform spatial denoising, temporal denoising, edge enhancement, sharpening, scaling (e.g., upscaling, downscaling), etc.

In some examples, a first image sensor 12 corresponding to a first camera may be the same image sensor 12 that corresponds to a second camera. That is, image sensor 12 that corresponds to a second camera may be the same first image sensor that corresponds to the first camera. The first camera and the second camera may provide different effective focal lengths, for example, due to different lenses being used, the activation of moving prisms, etc. In some examples, camera processor(s) 14 may move lens 13A or lens 13B according to an autofocus process and/or in response to zoom settings. In performing the autofocus process or when applying the various zoom settings, camera processor(s) 14 may cause lens 13A to move in order to achieve a particular focal length. The autofocus process may include focusing and subsequent defocusing, or vice versa.

Display 28 may include a monitor, a television, a projection device, a liquid crystal display (LCD), a plasma display panel, a light emitting diode (LED) array, an organic LED (OLED), electronic paper, a surface-conduction electron-emitted display (SED), a laser television display, a nanocrystal display or another type of display unit. Display 28 may be integrated within computing device 10. For instance, display 28 may be a screen of a mobile telephone handset, a tablet computer, or a laptop. Alternatively, display 28 may be a stand-alone device coupled to computing device 10 via a wired or wireless communications link. For instance, display 28 may be a computer monitor or flat panel display connected to a personal computer via a cable or wireless link. Display 28 may provide preview frames that a user may view to see what is being stored or what a picture might look like if camera 15 were to actually take a picture or start recording video.

In some zoom operations, camera processor(s) 14 may utilize such techniques in cases where pixel binning techniques are used that adapt to increasing or decreasing zoom levels, as described in U.S. patent application Ser. No. 16/667,662 by Liu et al., entitled "IMAGE CAPTURE MODE ADAPTATION," filed on Oct. 29, 2019 and incorporated herein by reference in its entirety. In general, image sensor(s) 12 perform pixel binning by combining multiple pixels of image sensor(s) 12 into fewer pixels for output to a camera processor (e.g., 4×4 binning, 3×3 binning, 2×2 binning, horizontal binning, vertical binning, etc.). Binning techniques improve the signal-to-noise ratio (SNR) by allowing image sensor(s) 12, or in some instances, camera processor(s) 14, to combine pixels together through various combination schemes, including averaging or summing multiple pixels together for each output pixel. Pursuant to such techniques, image sensor(s) 12 may output less pixels during binning level transitions and/or camera transitions. In such examples, among others, camera processor(s) 14 may align pixels of a first frame obtained prior to a camera transition and pursuant to a first binning mode (e.g., binning at a first binning level, such as an unbinning level) with pixels of a second frame obtained following the camera transition and pursuant to a second binning mode (e.g., binning at a second binning level that differs from the first binning level). In an illustrative example, camera processor(s) 14 may obtain a first frame prior to a camera transition that comprises pixels binned at a first binning level and that includes a reduced number of pixels compared to the number of pixels available via a first image sensor 12. In response to a camera transition, camera processor(s) 14 may obtain a next frame that comprises pixels binned at a second level that is different from the first binning level. Camera processor(s) 14 may align the first frame and the second frame (e.g., via geometrical warping) and as such, camera processor(s) 14 may blend pixels of the first frame and the second frame to produce a first blended frame.

In addition, frames obtained may include composite frames created from multiple frames of a same camera. In an example, the first frame obtained from first camera 15 prior to a camera transition may be a frame that is composed of multiple frames (e.g., multiple defocused frames) that camera processor(s) 14 may combine to form a single focused frame for output via the output flow. In such instances, the first frame may be aligned with a frame obtained from second camera 15, and as such, camera processor(s) 14 may blend pixels of the first frame and the second frame to produce a first blended frame.

In some examples, camera processor(s) 14 may output a flow of frames to memory controller 24 in order for the output frames to be stored as a video file. In some examples, CPU 16, video encoder/decoder 17, and/or camera processor 14 may output frames to be stored as a video file. In some examples, memory controller 24 may generate and/or store the output frames in any suitable video file format. In some examples, video encoder/decoder 17 may encode the output frames prior to CPU 16, video encoder/decoder 17, and/or camera processor 14 causing the output frames to be stored as an encoded video. Encoder/decoder 17 may encode frames of image data using various encoding techniques, including those described in standards defined by MPEG-2, MPEG-4, ITU-T H.263, ITU-T H.264/MPEG-4, Part 10, Advanced Video Coding (AVC), ITU-T H.265/High Efficiency Video Coding (HEVC), Versatile Video Coding (VCC), etc., and extensions thereof. In a non-limiting example, CPU 16, video encoder/decoder 17, and/or camera processor 14 may cause the output frames (e.g., geometrically warped frames, blended frames, unblended frames, etc.) to be stored using a Moving Picture Experts Group (MPEG) video file format.

When implementing such camera transitions, such as during a zoom operation, camera processor(s) 14 may effectively obtain a first set of input frames from a first camera 15 prior to a camera transition and a second set of input frames from another camera 15 following the camera transition. Camera processor(s) 14, in turn, may be configured to produce a single flow of output frames, based on respective output frames associated with each camera 15. In such examples, camera processor(s) 14 may blend a currently captured frame obtained from one camera 15 with a previous output frame obtained from another camera 15 to produce a first blended frame that follows the previous output frame in a flow of output frames. Camera processor(s) 14 may be configured to perform various techniques when combining the respective output frames, such that, for example, an end-user would not perceive the occurrence of a camera transition or otherwise may only perceive the transition to a certain, minimum extent acceptable to the user. Due to various differences between cameras 15, however, such as differences between lens shapes, lens sizes, sensor algorithms, sensor sizes, sensor types, etc., frames obtained from each camera 15 may, nevertheless, flow together in such a way that the transition is still perceptible to the human eye, such as in a resulting video or in a preview display. In another example, the camera processor may output frames to video encoder/decoder 17. Video encoder/decoder 17 may be configured to produce video files, such as a compressed video file. As such, video encoder/decoder 17 may, in some instances, produce a video file based on an analysis of various differences between output frames of an output flow.

In order to bridge otherwise abrupt transitions between cameras 15 and to potentially produce a seamless flow of output frames, camera processor(s) 14 may employ additional pre- and/or post-processing operations based on, for example, camera specifications, context of a scene being captured, and/or offline processing that may not occur until complete set of frames are captured. Certain operations, however, when implemented or if not implemented judiciously, may result in a relatively inefficient consumption of power, memory, and/or processing resources, or may otherwise involve potentially extraneous or imprecise camera operations. In any case, an imprecise or extraneous camera operation used to bridge an otherwise abrupt camera transition may ultimately have the unintended effect of introducing extraneous qualitative differences between one or more input frames and one or more corresponding output frames. That is, certain operations may not only introduce such qualitative differences between frames immediately following a camera transition, but may extraneously introduce such differences for a prolonged period of time following the camera transition and/or for a time preceding the camera transition.

As such, camera processor(s) 14 may blend, in response to a camera transition from a first camera 15 to a second camera 15, pixels of a first frame with pixels of a second frame to produce a first blended frame. In such instances, the first frame captured via the first camera 15, and the second frame captured via the second camera 15. In addition, camera processor(s) 14 may obtain a third frame captured via second camera 15. In such instances, camera processor(s) 14 may blend pixels of the first blended frame with pixels of the third frame to produce a second blended frame. That is, camera processor(s) 14 may in response to a camera transition from first camera 15 to a second camera 15, may initiate a blending process. In the blending process, camera processor(s) 14 may blend pixels of a first frame with pixels of a second frame to produce a first blended frame, where the first blended frame comprises corresponding contribution levels from the first frame and the second frame.

Figure 2:
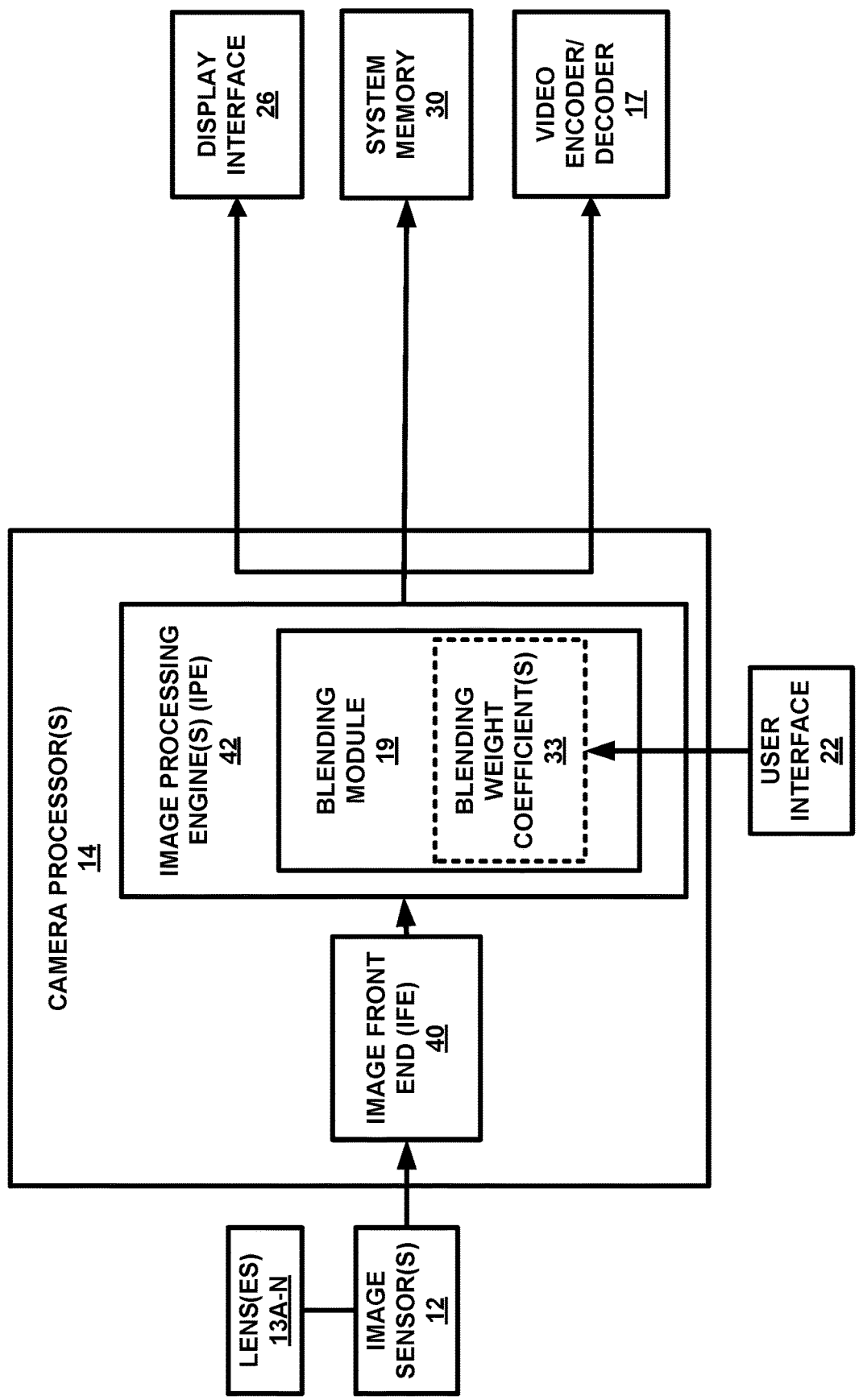
FIG. 2 is a block diagram illustrating example components of the computing device of FIG. 1, in accordance with various aspects of the techniques described in this disclosure.

FIG. 2 is a block diagram illustrating example components of computing device 10, in accordance with one or more of the various techniques of this disclosure. In some examples, camera processor(s) 14 may include an image front end (IFE) 40. In some examples, IFE 40 interfaces between image sensor(s) 12 and one or more image processing engine(s) IPE(s) 42. In some examples, one of IPEs 42 may perform real-time processing of image data. In some examples, one or more IPEs 42 may be configured to perform techniques such as, spatial processing, temporal processing, sharpening, denoising, etc. In addition, camera processor(s) 14 may be configured to perform various operations on image data captured by sensor(s) 12, including blending of pixels between frames, 3A synchronization, etc. 3A algorithms represent the functionality of a statistics algorithm processing engine of camera processor(s) 14. The 3A algorithms may include autofocus (AF), auto exposure control (AEC), and auto white balance (AWB). In performing 3A algorithms, IPE(s) 42 may be configured to perform one or more of AF, AEC, and/or AWB processing to control the function of image sensor(s) 12.

In some examples, camera processor(s) 14 may include IPE(s) 42 that represent image processing engines internal to camera processor(s) 14. IPE(s) 42 may be configured to handle various real-time image processing techniques (e.g., image processing that occurs at the same speed as image sensor(s) 12 throughput rate). In some examples, IPE(s) 42 may be configured to perform processing techniques for video and image preview, such as 3A processing. In some examples, a processing "engine" may refer to hardware that can be used to process data. Example hardware may include fixed-function or programmable processing engines in camera processor(s) 14, GPU 18, CPU 16, a DSP, or any other processing circuitry available on computing device 10.

In some examples, IPE(s) 42 may operate a blending module 19 configured to perform pixel blending in accordance with the one or more of the various techniques of this disclosure. In an example, blending module 19 may implement one or more blending weight coefficient(s) 33 to blend pixels of frames. The blending weight coefficient(s) 33 may be tunable, automatically or by manual input. The blending weight coefficient(s) 33 may include a tunable blending weight that is tunable automatically by camera processor(s) 14, or in some instances, by way of a manual process. In an example, camera processor(s) 14 may tune a blending weight coefficient 33 from a first value to a second value, such as a based on an amount of detail captured in a frame. Camera processor(s) 14 may apply a high pass filter or another filter to pixels of an incoming frame (e.g., a first frame 404, second frame 406, or a third frame that follows second frame 406) to determine the amount of detail captured in the incoming frame. In another example, camera processor(s) 14 may tune blending weight coefficient 33 based on characteristic differences between sensor(s) 12 of the camera transition, 3A synchronization methods employed by camera processor(s) 14 and the results of such 3A synchronization methods, frame rate (e.g., frames per second), geometric alignment (e.g., whether frames are well-aligned, misaligned, misaligned by a particular amount, aligned by a particular amount, etc.), camera modes, etc.

In an illustrative example, camera processor(s) 14 may determine a first blending weight coefficient 33 to apply during a camera mode involving a slow motion capture of frames and a camera transition that results from changes in zoom settings during the slow motion capture. In another example, camera processor(s) 14 may determine a second blending weight coefficient 33 that differs from the first blending weight coefficient 33 during a normal capture mode of frames (e.g., not slow motion). In the illustrative example, the second blending weight coefficient 33 may be lower than the first blending weight coefficient 33.

In such examples, better processing, quality, resolution, etc. may be achieved for frames obtained from different cameras 15 prior to a camera transition and after the camera transition. In addition, in implementations allowing high processing capabilities, selectively allocating processing resources (e.g., blend transition processing, geometric warping), such as based on blending coefficients, timing of when to start and stop blending (e.g., tuning parameters), whether to invoke transition blending, etc., may also reduce power consumption of computing device 10. That is, camera processor(s) 14 may produce blended frames following a camera transition, such that the frames following the camera transition blend with a last frame obtained from a previous camera, such that the transition between frames is relatively seamless in a visual and/or coding sense and processing resources may be conserved simultaneously.

In an illustrative example, image sensor(s) 12 may capture a frame of image data and output the frame of image data to IFE 40. In some examples, IFE 40 or IPE(s) 42 may apply a warping operation to the frame of image data to produce a geometrically warped frame of the image data.

Figure 3:
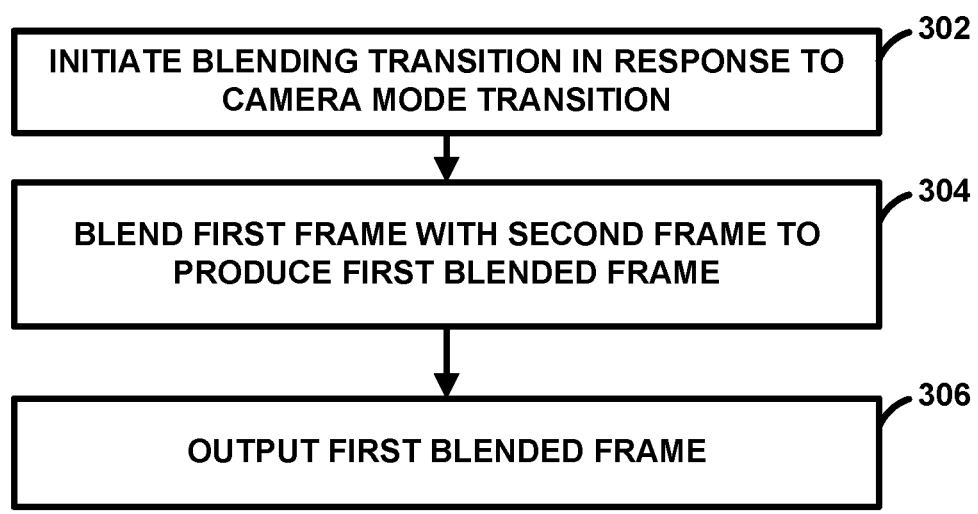
FIG. 3 is a flowchart illustrating an example method and technique for transition blending, in accordance with various aspects of the techniques described in this disclosure.

FIG. 3 is a flowchart illustrating an example method and technique for transition blending, in accordance with various aspects of the techniques described in this disclosure. In an example, camera processor(s) 14 may receive frames of image data from image sensor(s) 12. In addition, camera processor(s) 14 may apply zoom settings to the frames. In response to particular zoom levels, camera processor(s) 14 may initiate a camera transition from first camera 15 (e.g., a first combination of lens(es) 13 and image sensor(s) 12) to second camera 15 (e.g., a second combination of lens(es) 13 and image sensor(s) 12). In response to the camera transition, camera processor(s) 14 may initiate application of the blending function that results in a blending of pixels from two input frames to produce a blended output frame.

The camera transition may include a lens 13 transition and/or an image sensor 12 transition. In some instances, camera processor(s) 14 may initiate the camera transition by deactivating first camera 15 prior to blending a first frame obtained from first camera 15 with another frame obtained via second camera 15. In an example, first camera 15 may have a first FOV and second camera may have a second FOV. In an non-limiting example, the first FOV may be disposed within the second FOV, or vice versa. In another example, first camera 15 may have a first focal length and second camera 15 may have a second focal length. In various examples, a first camera 15 may be configured to capture image data of a scene according to a first focal length of the first camera 15, such as an effective focal length that corresponds to a first combination of lens(es) 13 and image sensor(s) 12 that camera processor(s) 14 have signaled to define the first camera 15. Likewise, a second camera 15 may be configured to capture image data of the scene according to a second focal length, such as an effective focal length that corresponds to a second combination of lens(es) 13 and image sensor(s) 12 that camera processor(s) 14 have signaled to define the second camera 15, where the second focal length of the second camera 15 is, in some instances, different than first focal length of the first camera 15

In some examples, camera processor(s) 14 may cause an automatic transition from first camera 15 to second camera 15 in order to achieve the particular zoom level. In another example, the camera processor may cause a transition from a second camera to a third camera 15 in response to detecting another zoom level. It should be understood that various other zoom operations may be achieved based on similar camera transition techniques (e.g., in response to a zoom level decrease, transitioning from the third camera to the first camera, in response to a zoom level increase, transitioning from the first camera to the second camera, in response to a zoom level increase, transitioning to a third and/or fourth camera, etc.).

In some examples, camera processor(s) 14 may obtain a first frame via first lens 13 and/or first image sensor 12. Camera processor(s) 14 may output, prior to the camera transition, the first frame, such as by outputting a geometrically warped first frame. Similarly, camera processor(s) 14 may obtain a second frame via second lens 13 and/or second image sensor 12. In such instances, prior to transition blending, align the first frame with the second frame prior to blending pixels of the first frame with pixels of the second frame.

In such examples, camera processor(s) 14 may initiate a blending transition in response to the camera transition from a first camera mode to a second camera mode, such as by transitioning from first camera 15 to second camera 15 (302). Camera processor(s) 14 may initiate the camera transition in response to a signal received indicating a changing zoom level (e.g., a first zoom level corresponding to a first camera changing to a second zoom level that is a higher zoom level relative to the first zoom level). As such, camera processor(s) 14 may receive the signal as a transition signal indicating to camera processor(s) 14 to transition from a first camera mode to a second camera mode. The transition from the first camera mode to the second camera mode may include a transition in power states relative to a first camera lens 13 and image sensor 12 combination (e.g., a first camera 15) having a first effective focal length) and a second camera lens 13 and image sensor 12 combination (e.g., a second camera 15) having a second effective focal length that differs from the first effective focal length of the first camera lens 13 and image sensor 12 combination.

In some examples, camera processor(s) 14 may deactivate the first camera 15 to a first power state and may activate (e.g., elevate) the second camera 15 to a second power state that is higher than the first power state. In this way, camera processor(s) 14 may emphasize one camera over another in terms of power states allocated for each camera, where both the first camera 15 and the second camera 15 may remain active even if the first camera 15 is deactivated to a lower power state relative to the power state of the second camera 15. That is, the second camera 15 is activated in response to a transition from the first camera mode to the second camera mode by altering the power state of the second camera 15 to a higher power state (e.g., full power capacity usage) relative to a power state of first camera 15, which may have previously held the higher power state when the first camera 15 was active as the primary camera. In another example, the transition from the first camera mode to the second camera mode may include a transition from a geometric warping process to a transition blending process, where the transition blending process is decoupled from the geometric warping process as separated by a predetermined zoom level threshold.

In such examples, camera processor(s) 14 may, in response to receiving the transition signal, transition from the first camera mode to the second camera mode. Subsequent to the transition from the first camera mode to the second camera mode, camera processor(s) 14 may blend the first frame with the second frame to produce a first blended frame (304). In some examples, camera processor(s) 14 may blend pixels of a first frame with pixels of a second frame to produce a first blended frame. In an example, camera processor(s) 14 may blend one or more pixels of the first frame with a corresponding one or more pixels of the second frame to produce a first blended frame (e.g., a first frame that includes one or more blended pixels). Prior to blending the pixels, camera processor(s) 14 may spatially align the pixels of the second frame with pixels of the first frame, such that particular pixels of one frame align with specific pixels of a subsequent frame to achieve a proper blending of pixels to produce a frame that includes one or more blended pixels. In addition, camera processor(s) 14 may blend a first portion of the pixels of the first frame with a second portion of the pixels of the second frame, such as in instances where other portions of the frames include a blending weight of 0. In an examples, a frame may include blending weights of 0 for edges or corners of a frame. In some examples, camera processor(s) 14 may blend pixels associated with the first and second portions to provide an improved SNR relative to the first blended frame, where the first blended frame may include other portions that do not include blended pixels (e.g., pixels corresponding to edges, pixels corresponding to corners, etc.).

In an illustrative example, the first frame is captured via first camera 15 pursuant to a first mode and the second frame is captured pursuant to a second mode via second camera 15. The second frame may be captured in succession with the first frame. In an example, the first camera 15 may include a primary camera, such as a main camera or default camera. In a non-limiting example, the first camera 15 may include a prime lens, a wide angle lens, an ultra-wide angle lens. Likewise, the second camera 15 may include a telephoto lens. In any case, the first camera 15 and the second camera 15 may be configured, based on different lens(es) 13 and/or image sensor(s) 12 of each, to image a scene using different effective focal lengths and/or pursuant to different zoom levels. In an example, camera processor(s) 14 may utilize the first camera 15 as the effective primary camera to capture image data for generation of a preview stream (e.g., for providing a preview via display 28), video recording, video encoding, etc.

As used herein, when two frames are captured "in succession" this generally refers to substantially successive frames, where in some instances, a partial temporal overlap may nevertheless occur between successive frame. In an illustrative example involving the second camera 15 corresponding to a telephoto lens, camera processor(s) 14 may cause a longer exposure during the transition from the first mode to the second mode, and as such, camera processor(s) 14 may initiate the transition from the first mode to the second mode while first camera 15 is capturing the first frame so as to provide a seamless output frame rate when transitioning modes. That is, in instances where exposure times are different due to pixel sizing of first camera 15 and second camera 15, partial temporal overlap may occur even when the second frame is captured in succession with the first frame via second camera 15.

In some examples, a first frame may be captured at a first time (t1) and a second frame may be captured at a second time (t2), where t1 and t2 follow in time (e.g., are consecutive in time) without the first camera 15 or the second camera 15 capturing additional frames in the interim. In some instances, however, the first camera 15 may capture multiple frames at the first time and/or the second camera 15 may capture multiple frames at the second time, where the multiple frames may be combined to account for lens distortion in instances where the first camera 15 or the second camera 15 includes lenses 13 that use frame fusion to correct for frames having some regions in focus and other regions out-of-focus due to the particular geometry of lens 13. In any case, camera processor(s) 14 may obtain a first frame (e.g., a first fusion frame, a geometrically warped frame, etc.) via a first camera 15 and may obtain a successive second frame (e.g., a first frame obtained during the second camera mode, a first fused frame obtained during the second camera mode) via a second camera 15, and blend the first frame obtained via first camera 15 during the first mode with the second frame obtained via second camera 15. That is, such techniques may be performed even in instances where various other camera processing techniques are used, such as frame fusion techniques, or where exposure times are advantageously varied during a transition from the first mode to the second mode, which may in turn, result in partial temporal overlap between successive frames that bridge the transition from the first mode that employs the first camera 15 to the second mode that employs the second camera 15.

Camera processor(s) 14 may utilize the first camera 15 as the primary camera based on a FOV and/or based on user preferences. In an example, camera processor(s) 14 may receive user input indicating a particular lens 13 and image sensor 12 combination that camera processor(s) 14 is to set as the first primary camera, with the first primary camera (e.g., a default camera) being the initial camera activated as the primary camera upon the launch of a camera software application via computing device 10. Computing device 10 (e.g., camera processor(s) 14 and/or CPU 16) may transition from a first mode to a second mode, where in the second mode, computing device 10 causes the second camera 15 to take over as the primary camera with the first camera 15 being deactivated as the primary camera (e.g., deemphasized, powered to a lower power state relative to a higher power state of another camera 15, etc.) As such, camera processor(s) 14 may blend at least one pixel (e.g., a first pixel) of the first frame with at least one corresponding pixel of the second frame to produce the first blended frame (e.g., blended pixels for the first blended frame). In an example, a pixel of the second frame may map to a particular pixel of the first frame, which in some instances may be pursuant to a spatial alignment of the first frame and the second frame, such that the pixel of the second frame and the corresponding pixel of the first frame represent temporarily or spatially contiguous pixel representations of the scene to be captured via the first camera mode and the second camera mode. In some examples, the first blended frame comprises at least one blended pixel that comprises a first contribution level from the at least one pixel of the first frame and a second corresponding contribution level from the at least one pixel of the second frame.

In some examples, camera processor(s) 14 may blend the one or more pixels of the first frame with the one or more pixels of the second frame by applying a blending function that determines pixel contribution levels as follows:

$$Y_1' = \alpha(X_M^*) + (1-\alpha)Y_1,$$

wherein:
$Y_1'$ represents the first blended frame,
$X_M^*$ represents the first frame with geometrical warping,
$Y_1$ represents the second frame, and
$\alpha$ represents a blending weight that follows: $0 \leq \alpha \leq 1$.

In some examples, camera processor(s) 14 may determine, automatically, or based on manual input, or both, a value to assign the blending weight (e.g., between 0 and 1, 0 and 100%, etc.). In such examples, camera processor(s) 14 may geometrically warp the first frame $(X_M^*)$ that first camera 15 captures prior to the camera transition (e.g., the transition signaled to switch from the first camera mode to the second camera mode to initiate the blending transition process). That is, camera processor(s) 14 may blend frames at the local pixel level for each pair of frames that are being blended. In some examples, camera processor(s) 14 may forego blending one or more pixels of the first frame, such as one or more edge pixels (e.g., corner pixels), while blending one or more other pixels of the first frame with one or more corresponding pixels of the second frame. In such examples, the first blended frame, generated via pixels of the first frame and pixels of the second frame, may include a contribution from the first frame and a reciprocal contribution from the second frame relative to a reduced portion of the first blended frame based on the blending weights or another equivalent method of foregoing blending of pixels in particular regions of the frames during the blending transition process (e.g., during the second camera mode).

In some examples, camera processor(s) 14 may output the first blended frame (306). In some examples, camera processor(s) 14 may output the first blended frame after the first frame. The first frame in some instances, may include a geometrically warped frame. In such instances, the blended frames produced following the camera transition may have a different FOV compared to that of an unblended frame obtained during a period prior the camera transition, such as a warping period prior to a camera transition. In some examples, camera processor(s) 14 may perform a global 3A synchronization process on frames including the first frame obtained from first camera 15 and the first blended frame. In some examples, camera processor(s) 14 may output the first frame and the first blended frame to video encoder/decoder 17, system memory 30, and/or to display interface 26.

In some examples, camera processor(s) 14 may output the first blended frame (306). Camera processor(s) 14 may output the first blended frame in succession with the first frame. In addition, when outputting the first frame, camera processor(s) 14 cause a geometrical warping of the first frame pursuant to a first warping period that extends up until the camera transition; and output the first frame comprising the geometrical warping. In some examples, camera processor(s) 14 may output the first blended frame to an encoder/decoder 17, display interface 26 (e.g., for display via display 28), or system memory 30 (e.g., DRAM). In some examples, camera processor(s) 14 may output the first blended frame for additional processing via IPE(s) 42. In another example, IPE(s) 42 may output the first blended frame to another one of IPE(s) 42. In one example, one of IPE(s) 42 may output the warped frame to system memory 30 for subsequent access by the same one of IPE(s) 42. In another example, IPE(s) 42 may output the first blended frame to another component or logical node of computing device 10, such as a 3A node, for further processing. In some examples, camera processor(s) 14 may output the first blended frame to GPU 18. GPU 18 may store the first blended frame to local memory 20 for subsequent access and processing. In the interest of brevity, not all possible blended frame output outcomes may be listed, but it will be understood that more output outcomes are possible for the first blended frame using camera processor(s) 14 in the context of computing device 10.

In some examples, camera processor(s) 14 may detect a change in zoom direction subsequent to the camera transition. In such instances, camera processor(s) 14 may, in response to detecting the change, output a plurality of subsequent frames pursuant to a second camera process, where the second camera process separate and distinct from the blending initiated at the camera transition. The second camera process may include a geometrical warping process or another process, such as a normal output flow process where an output frame is normal to the input frame.

Figure 4:
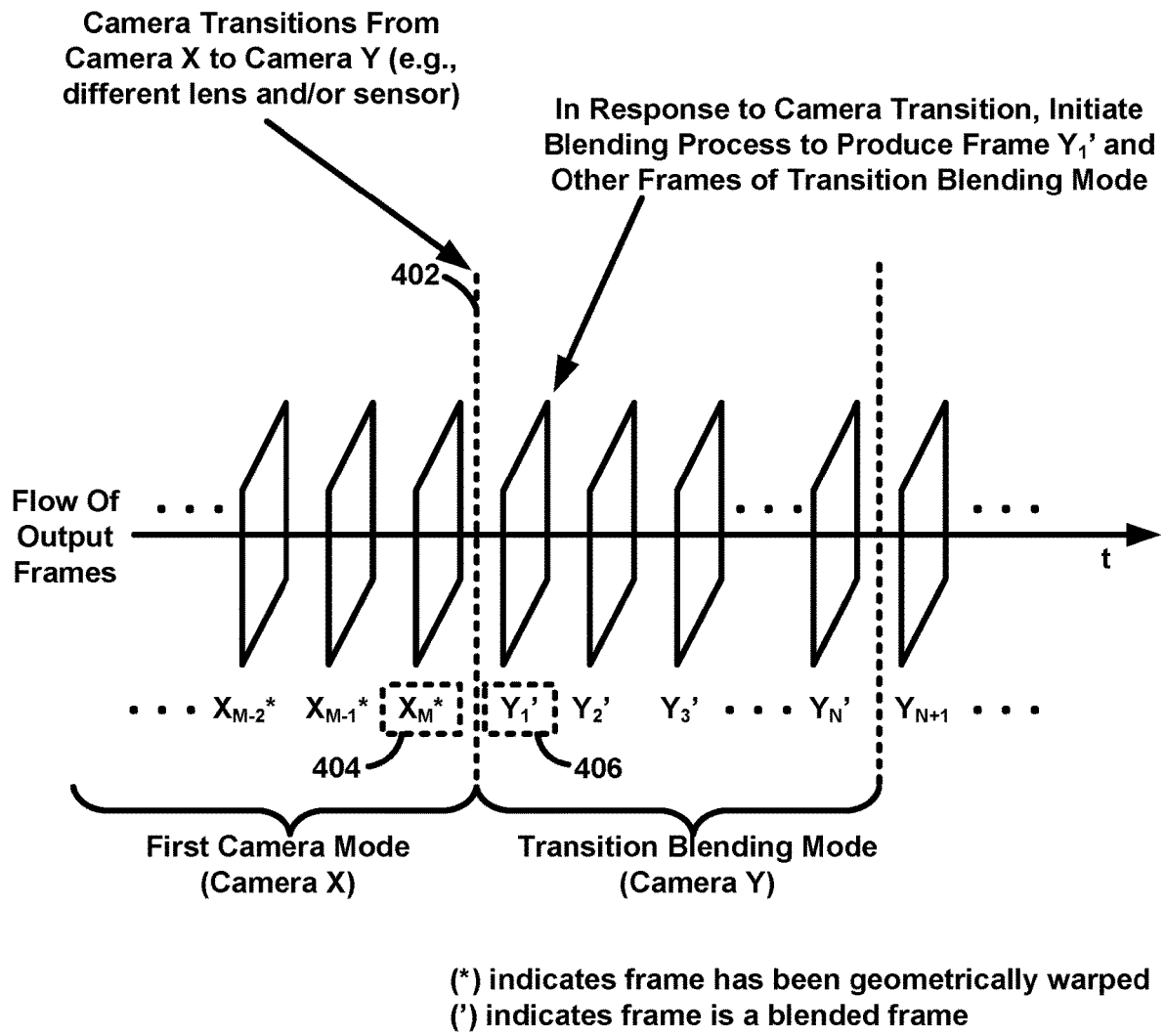
FIG. 4 is a conceptual diagram that illustrates an example camera transition and example transition blending mode, in accordance with various aspects of the techniques described in this disclosure.

FIG. 4 is a conceptual diagram that illustrates an example camera transition 402 and example transition blending mode, in accordance with various aspects of the techniques described in this disclosure. Camera processor(s) 14 may obtain, from a first camera 15, a first input frame that corresponds to first output frame 404. Camera processor(s) 14 may obtain, from a second camera 15, a second frame that corresponds to the first blended frame 406 of the transition blending mode. Camera processor(s) 14 may perform produce first blended frame 406 based on a blending of pixels corresponding to frame 404 (e.g., pixels of frame 404, pixels of the input frame corresponding to frame 404). In addition, camera processor(s) 14 may blend pixels of blended frame 406 with a second input frame obtained from second camera 15 to produce a second blended frame $Y_2'$. In some examples, the transition blending mode may continue until a pixel contribution amount from frame 404 has dropped below a predefined threshold or until a predefined number of frames have been obtained from second camera 15 and/or output pursuant to the transition blending mode or until a predefined amount of time has elapsed since camera transition 402 (e.g., the initiation of the transition blending mode).

Figure 5:
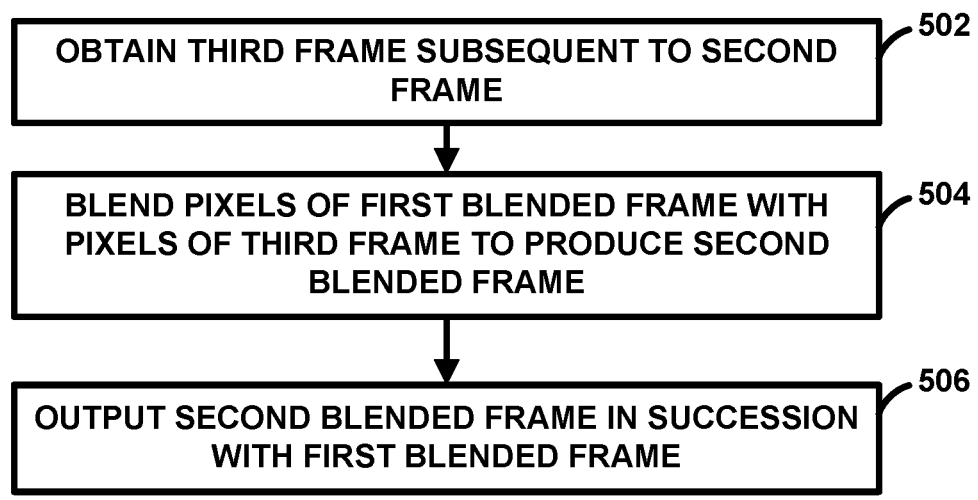
FIG. 5 is a flowchart illustrating an example method and technique for recursive transition blending, in accordance with various aspects of the techniques described in this disclosure.

FIG. 5 is a flowchart illustrating an example method and technique for recursive transition blending, in accordance with various aspects of the techniques described in this disclosure. In some examples, camera processor(s) 14 may perform pixel blending following a camera transition that, for example, is based on a geometrically warped frame obtained prior to the camera transition (e.g., a first frame). Camera processor(s) 14 may obtain a second frame following the first frame, which is the first frame following the camera transition. In such examples, camera processor(s) 14 may obtain a third frame that may be the second frame following the camera transition (502). The third frame may be subsequent to the second frame obtained from second camera 15. In such examples, camera processor(s) 14 may blend pixels of the first blended frame with pixels of the third frame to produce a second blended frame (504).

In such examples, camera processor(s) 14 may blend a first pixel of the first blended frame with a corresponding first pixel of the third frame to produce the second blended frame. In some examples, camera processor(s) 14 may align the first blended frame with the third frame prior to blending pixels of the first blended frame with pixels of the third frame. In an example, camera processor(s) 14 may warp the first blended frame to align with corresponding pixels of the third frame prior to blending the first blended frame with the third frame to produce the second blended frame. Similar to outputting the first blended frame, camera processor(s) 14 may output the second blended frame in succession with the first blended frame (506).

Similar to producing the first blended frame, camera processor(s) 14 may blend pixels of the first blended frame with pixels of a plurality of successive frames based on a recursive blending function that follows:

$$Y_2' = \alpha(Y_1') + (1-\alpha)Y_2,$$

wherein:
$Y_2'$ represents a second blended frame,
$Y_1'$ represents the first blended frame, and
$Y_2$ represents an incoming frame (e.g., a third frame).

The recursive blending function may continue for each successive frame until a particular trigger frame is received. In an example, the trigger frame may be an $n^{th}$ frame input or the output of a blended $n^{th}$ frame. Camera processor(s) 14 may output the $n^{th}$ frame as the last blended frame of the blending transition process. In such examples, camera processor(s) 14 may determine an $n^{th}$ frame trigger by determining that a predefined number of frames have been obtained or that a predefined duration of time has elapsed since the initiation of the blending transition process, or determine that a pixel contribution of pixels from the first frame comprises a value that satisfies a predefined pixel contribution threshold (e.g., falls below a contribution threshold).

In an illustrative example, camera processor(s) 14 may obtain an $n^{th}$ frame subsequent to the second frame and may output the $n^{th}$ frame as a last blended frame of a blending transition process. In such instances, the last blended frame of the blending transition process includes a lower pixel contribution of pixels from the first frame relative to a blended output frame that precedes the last blended frame in the blending transition process. In such examples, the lower pixel contribution includes a cascading pixel contribution that cascades pixel contributions throughout successively blended frames via the blending transition process.

In addition, camera processor(s) 14 may obtain a frame that follows the $n^{th}$ frame (e.g., as part of a phase that follows the blending phase). Pursuant to a camera mode that initiates following the blending phase, camera processor(s) 14 may output the frame that follows the $n^{th}$ frame as an unblended frame.

Figure 6:
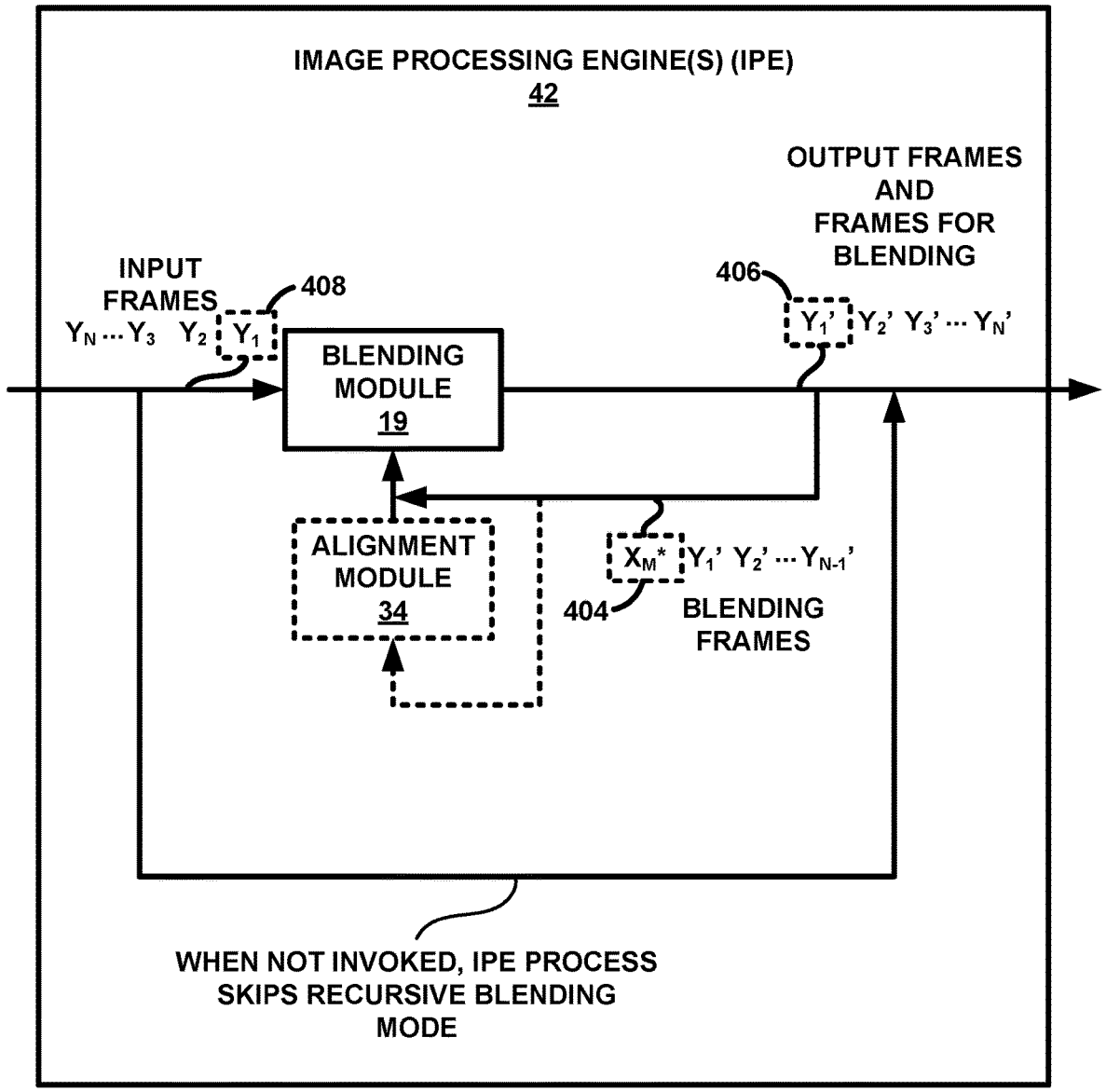
FIG. 6 is a conceptual diagram that illustrates an example of recursive transition blending, in accordance with various aspects of the techniques described in this disclosure.

FIG. 6 is a conceptual diagram that illustrates an example of recursive transition blending following a camera transition from first camera 15 (X) to second camera 15 (Y), in accordance with various aspects of the techniques described in this disclosure. While a specific sequence of operations is described, the techniques of this disclosure are not so limited. As such, the examples described with reference to FIG. 6 are intended to illustrate an example sequence of operations that involve transition blending operations. The example sequence is shown with reference to a conceptual blend of a first frame 404 with a second frame 408 to produce blended frame 406.

Blending module 19 may blend pixels of first frame 404 with pixels of second frame 408 to produce output frame 406. In addition alignment module 34 may, in some examples, align frames for blending. That is, an increasing zoom operation may cause two frames to not be aligned for blending. In such examples, alignment module 34 may perform a second geometric warping, which may be different than the first geometric warping performed during a phase that precedes the camera transition. In some examples, however, alignment module may not perform alignment of the frames, and as such, blending frame may be routed to blending module 19. Although shown as being returned to blending module 19, it will be understood that this is for illustration purposes, and that blending module 19 may instead retain copies of blended frames, such as in a buffer (e.g., a first-in, first-out buffer), that may be used to blend with input frames.

In another example, a last frame of a geometric warping process (e.g., frame 404) may not be output from or produced by blending module 19, and instead may be routed to blending module 19 from another module of IPE 42 or camera processor(s) 14, such as an IFE configured to perform frame warping operations. In some instances, camera processor(s) 14 may determine that camera processor(s) 14 was unsuccessful in aligning (e.g., warping) first frame 404 with second frame 408. In such instances, camera processor(s) 14 may determine to not invoke blending module 19 of IPE(s) 42 and instead to pass input frame 408 and first frame 404 through as output frames without blending. Otherwise, when camera processor(s) 14 determines a proper pre-transition alignment (e.g., geometrical warping) between first frame 404 obtained from first camera 15 and input frame 408 obtained from second camera 15, camera processor(s) 14 may proceed with invoking the blending transition process by utilizing blending module 19. As described herein, camera processor(s) 14 may, in some instances, utilize alignment module 34 to further align pixels from, for example, first frame 404 and second frame 408 that may otherwise be misaligned due to differences in zoom settings camera processor(s) 14 apply to both frames (e.g., 2.99× zoom and 3.01× zoom, where a camera transition may be configured to occur at 3.00× zoom).

As illustrated in FIG. 6, a last geometrically warped frame may enter alignment module 34. In examples where the second geometric warping is not implemented, IPE(s) 42 may route frame 404 to blending module 19 and bypass alignment module 34. In addition, IPE(s) 42 may output frame 404 (not shown in FIG. 6). Blending module 19 may obtain frame 408. Blending module 19 may blend pixels of frame 404 with pixels of frame 408 to produce blended frame 406. Blending module 19 may output blended frame 406 to continue the blending process until a final frame is blended of the blending transition process. IPE 42 may discontinue routing frames to blending module 19 after the blending process has concluded and in general, when not invoked, IPE 42 may skip the recursive blending mode altogether, such as prior to a camera transition and during a geometric warping phase.

Figure 7:
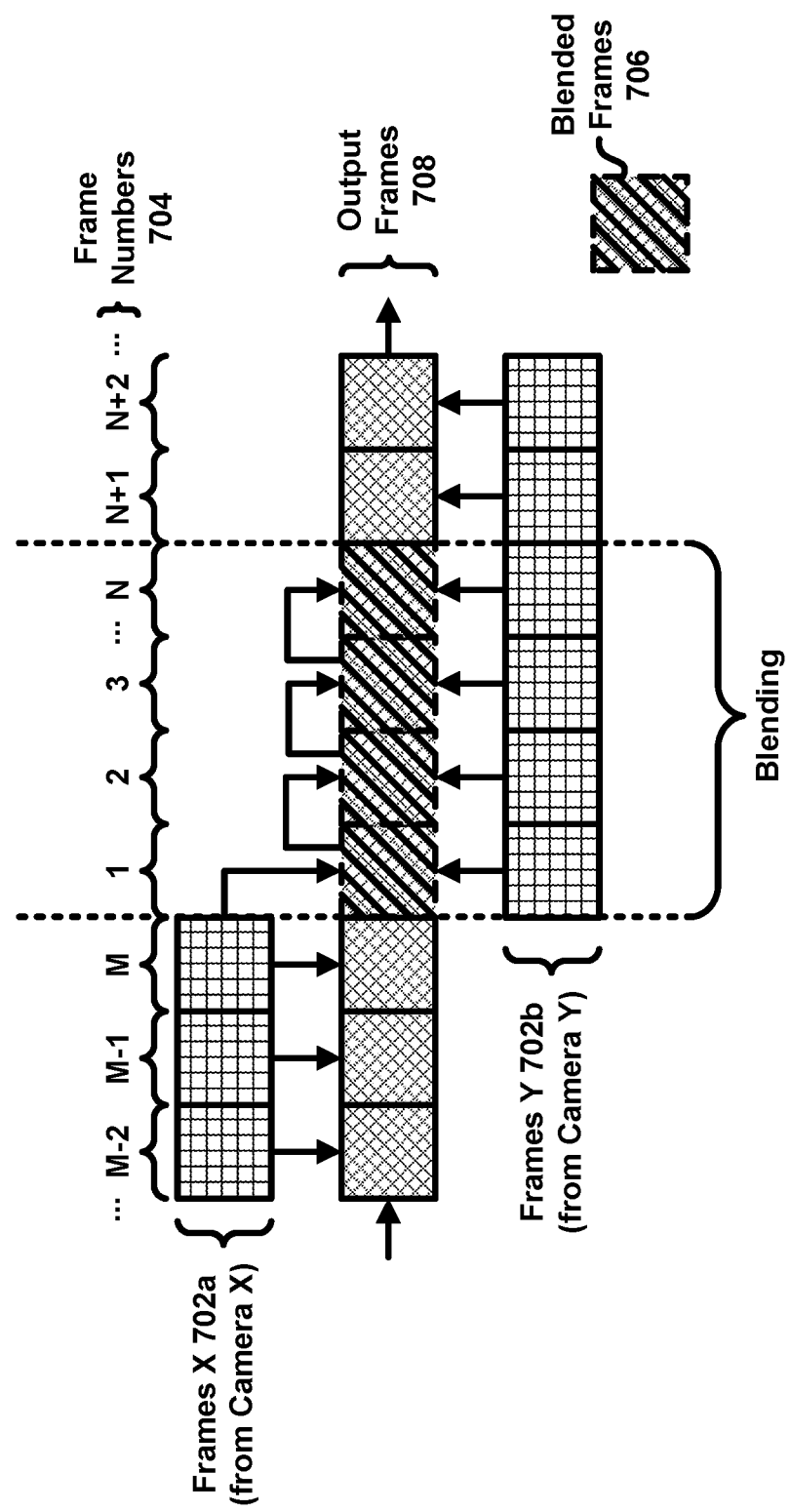
FIG. 7 is a diagram illustrating an example of recursive transition blending, in accordance with various aspects of the techniques described in this disclosure.

FIG. 7 is a diagram illustrating an example of recursive transition blending, in accordance with various aspects of the techniques described in this disclosure. In an example, camera processor(s) 14 may cause a transition between camera X (e.g., first camera 15) and camera Y (e.g., second camera 15). Frames X 702a may be frames produced from camera X (e.g., a wide-angle camera, a telephoto camera, etc.). Frames Y 702b may be frames produced from camera Y (e.g., a telephoto camera, a wide-angle camera, etc.). Output frames 708 may be frames that are output to display interface 26, that are transmitted to another device, and/or that are stored in system memory 30. Frame numbers 704 may be utilized to indicate frames (e.g., frames X 702a, frames Y 702b, and/or output frames 708) corresponding to particular time periods. Some configurations of the systems and methods disclosed herein may include transition blending that camera processor(s) 14 initiates in response to the camera transition from camera X to camera Y.

As illustrated in FIG. 7, output frames 708 may transition from frames X 702a to frames Y 702b. In transitioning from a first camera mode (e.g., first camera X) to a second camera mode (e.g., second camera Y), first camera 15 may be deactivated and second camera 15 may be activated. In this way, first camera 15 may be entered into a low-power hibernation state with second camera 15 being transitioned to a higher power state relative to the low-power hibernation state. As described, a camera transition between frames from different cameras 15 may occur during zooming procedures. For example, output frames 708 may transition to a telephoto lens from a wide-angle lens when zooming in. Similarly, output frames 708 may transition to a wide-angle lens (e.g., wide-angle camera) from a telephoto lens (e.g., telephoto camera) when zooming out. Camera processor(s) 14 may produce the output frames 708.

Camera processor(s) 14 may blend frame M with frame 1 following a camera transition. FIG. 7 illustrates four blended frames 706 (for frames 1-N). The number of blended frames following a camera transition may be 3 frames, 8 frames, 25 frames, 50 frames, 100 frames or any other predefined number of frames. Additionally or alternatively, the blending transition may occur over a particular time period (e.g., 0.5 seconds, 1 second, etc.). In such examples, camera processor(s) 14 may increase efficiency and conserve camera processing, power, or memory resources by not having concurrent frames from both cameras 15 during a prolonged camera transition and/or by performing transition blending in response to a camera transition as opposed to prior to the camera transition.

In some examples, camera processor may determine a tuning parameter that defines the maximum number of blended frames that are to follow the camera transition from first camera 15 to second camera 15. In some examples, camera processor(s) 14 may determine the tuning parameter based on a degree to which the photometric characteristics between frames obtained from first camera 15 and second camera 15 differ from one another. If the degree is small enough, such as when compared to a predefined threshold, camera processor(s) 14 may determine an agreement in photometric characteristics between subsequent frames, or at least only a partial mismatch between photometric characteristics between the subsequent frames.

In an illustrative and non-limiting example, camera processor(s) 14 may determine that a difference in tone, color, and/or contrast (TCC) between a first frame obtained from first camera 15 and a second frame obtained from second camera 15 satisfies a predefined threshold. In such instances, the predefined threshold may be indicative of a TCC agreement or at least only a partial mismatch between photometric characteristics between frames. In such instances, camera processor(s) 14 may determine a tuning parameter configured to invoke a momentary blending of one input frame following the camera transition or signal that IPE(s) 42 skip the transition blending of frames that otherwise results from the camera transition.

The tuning parameter may define, among other things, a number of frames that are to be blended following a given camera transition. The tuning parameter may be a variable that depends on the circumstances of the camera transition (e.g., differences in photometric qualities produced between frames of particular cameras 15) or may have a value that is constant for transitions between various cameras 15. In an example, camera processor(s) 14 may employ the same or different tuning parameters for a camera transition between first camera 15 and second camera 15 as camera processor(s) 14 may employ for camera transitions between second camera 15 and a third camera 15, the third camera 15 and second camera 15, the third camera 15 and first camera 15, etc.

In an illustrative example, camera processor(s) 14 may determine, for a first camera transition, a mismatch between photometric characteristics (e.g., TCC characteristics) that satisfies a first predefined threshold (e.g., a low mismatch between TCC characteristics of frames obtained from either camera 15). In such instances, camera processor(s) 14 may determine and employ a first tuning parameter that results in a first number of blended frames following the first camera transition. In another example, camera processor(s) 14 may determine, for a second camera transition, a mismatch between photometric characteristics that satisfies a second predefined threshold higher that is different from the first predefined threshold. In such instances, satisfying the second predefined threshold may indicate a relatively higher mismatch between photometric characteristics compared to that of the first camera transition. As such, camera processor(s) 14 may determine and employ a second tuning parameter that results in a second number of blended frames following the second camera transition. In such instances, the second tuning parameter may result in a second number of blended frames that includes more blended frames compared to that of the first camera transition (e.g., the first number of blended frames).

In some instances, upon determining a tuning parameter, camera processor(s) 14 may determine a blending weight coefficient 33 (e.g., α) based on the tuning parameter. In an example, upon determining a tuning parameter that would result in a higher number of blended frames (e.g., eight blended frames following a camera transition), camera processor(s) 14 may determine a relatively lower blending weight coefficient 33 (e.g., a equals 0.2, or 20% of the previous frame and 80% of the current frame). Likewise, upon determining a tuning parameter that would result in a lower number of blended frames (e.g., three blended frames following a camera transition), camera processor(s) 14 may determine a higher blending weight coefficient 33 (e.g., α equals 0.5, or 50% of the previous frame and 50% of the current frame).

In accordance with one or more various techniques of this disclosure, camera processor(s) 14 may process frame M obtained from camera X and frame 1 obtained from camera Y in a single pass, thereby potentially affording an increase in efficiency compared to that of, for example, a technique that might blend frame M with a previous frame prior to a camera transition. That is, camera processor(s) 14 may obtain each frame one time to effectuate the transition blending and may reduce the amount of holding or storage of each frame in a memory device, such as in buffer memory or on-chip memory. In one example, when blending occurs immediately before a camera transition, camera processor(s) 14 may be configured to hold and pre-process frame 1 prior to blending with frame M, which in turn, may result in the consumption of otherwise limited bandwidth, power, loads, etc., such that frame 1 may then be blended with frame M. As described herein, however, camera processor(s) 14 may blend frame 1 with frame M to produce a first blended frame without pre-processing frame 1 for blending and prior to outputting the first blended frame via output frames 708. Camera processor(s) 14 may realize similar efficiency savings when not employing concurrent frame processing following a camera transition because camera processor(s) 14 would then, as part of receiving concurrent frames, be tasked with processing at least one additional frame following the camera transition, which in some instances, may result in a perceivable or noticeable stall in the user-zoom experience.

Figure 8:
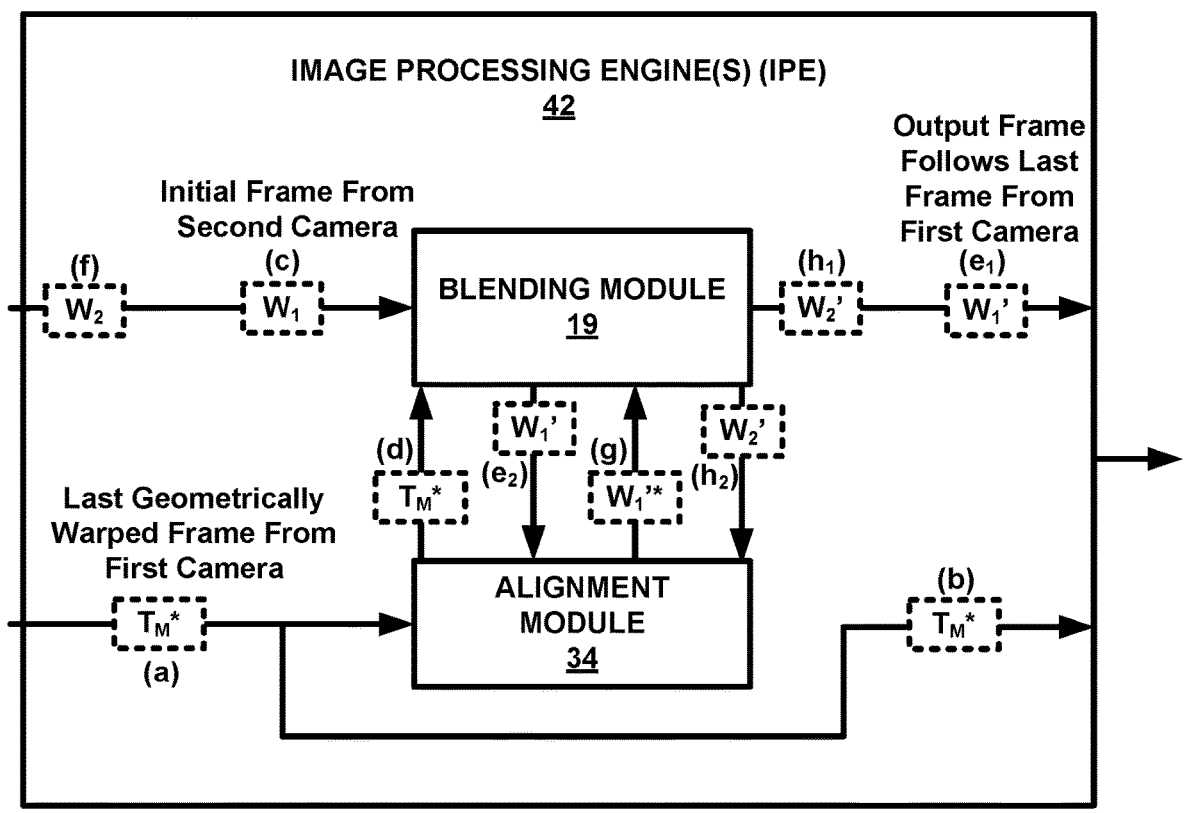
FIG. 8 is a conceptual diagram that illustrates an example of recursive transition blending, in accordance with various aspects of the techniques described in this disclosure.

FIG. 8 is a conceptual diagram that illustrates an example of recursive transition blending following a camera transition from first camera 15 to second camera 15, in accordance with various aspects of the techniques described in this disclosure. While a specific sequence of operations is described, the techniques of this disclosure are not so limited. As such, the examples described with reference to FIG. 8 are intended to illustrate an example sequence of operations that involve transition blending operations. The example sequence is shown with reference to a conceptual flow from a first frame (a) to a last frame ($h_1$) of the illustration. Blending module 19 may blend pixels of at least two frames to produce an output frame. In addition alignment module 34 may, in some examples, align frames for blending. That is, an increasing zoom operation may cause two frames to not be aligned during blending. In such examples, alignment module 34 may perform a second geometric warping, which may be different than the first geometric warping performed during a phase that precedes a camera transition.

As illustrated in FIG. 8, a last geometrically warped frame may enter alignment module 34. In examples where the second geometric warping is not implemented, IPE(s) 42 may route frame (a) to blending module 19 and bypass alignment module 34. In addition, IPE(s) 42 may output frame (a) as shown in (b). Blending module 19 may obtain frame (c). Blending module 19 may blend pixels of frame (c) with pixels of frame (d), which in some instances, represent the same pixels of frame (a) but with geometric displacement of the pixels. Blending module 19 may output blended frame ($e_1$) and additionally may provide frame ($e_2$) to alignment module 34 to align frame ($e_1$) with input frame (f). Alignment module 34 may produce frame (g) by aligning frame ($e_2$) with frame (f) for pixels blending, such as by displacing pixels of frame ($e_2$) to align with corresponding pixels of frame (f). Blending module 19 may blend pixels of frame (g) with input frame (f) to produce output frame ($h_1$). Blending module 19 may further provide pixel information of frame ($h_1$), such as in the form of frame ($h_2$), to continue the blending process until a final frame is blended of the blending transition process.

Figure 9:
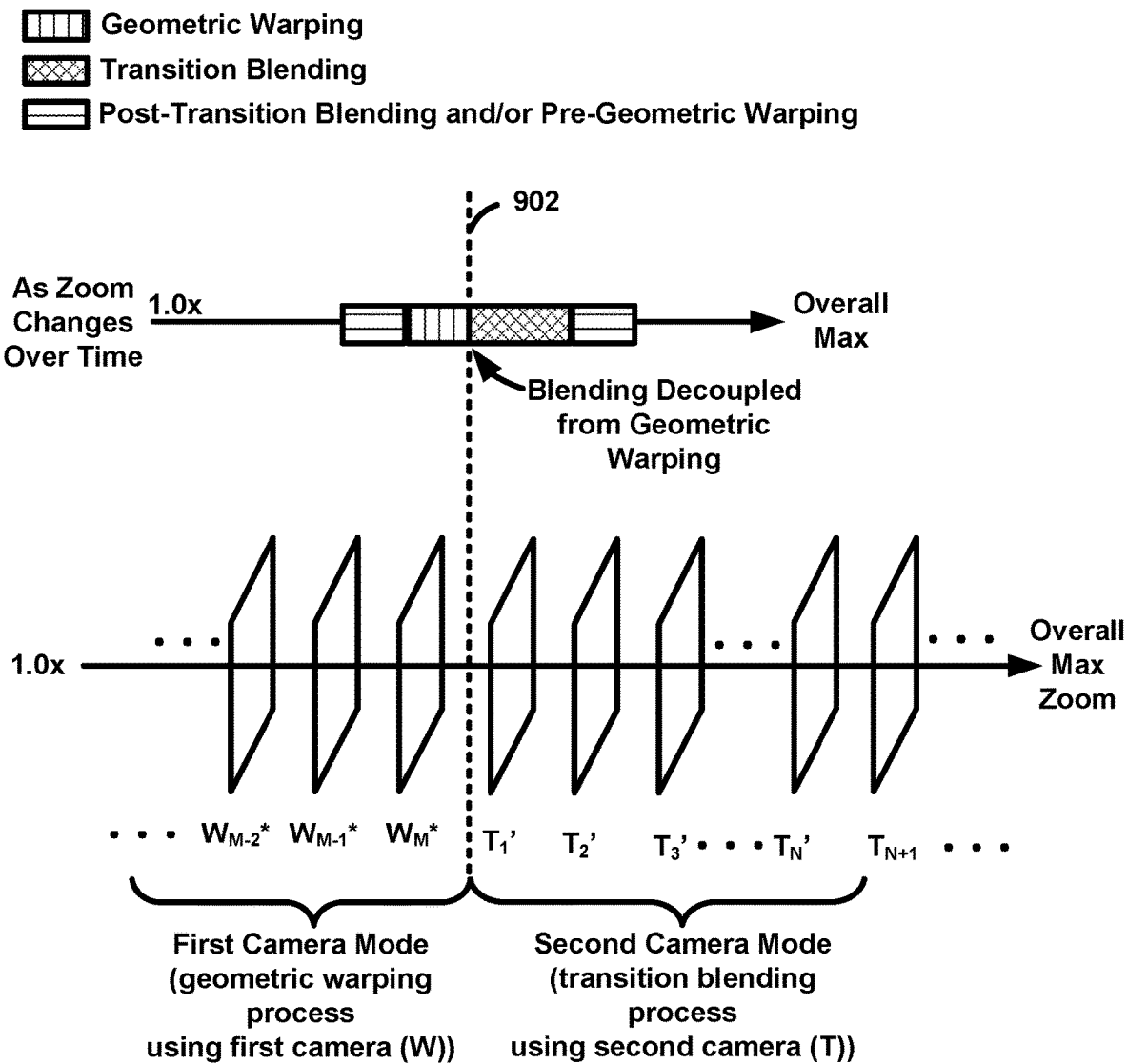
FIG. 9 is a conceptual diagram that illustrates an example camera transition and various phases before and after the example camera transition, in accordance with various aspects of the techniques described in this disclosure.

FIG. 9 is a conceptual diagram that illustrates an example camera transition 902 and various phases before and after camera transition 902, in accordance with various aspects of the techniques described in this disclosure. While a specific sequence of operations is described, including various phases before and after 902, the techniques of this disclosure are not so limited. As such, the examples described with reference to FIG. 9 are intended to illustrate an example sequence of operations that involve transition blending operations that may precede camera transition 902 and follow camera transition 902. In the example depicted, first camera 15 may obtain input frames that correspond to output frames denoted with a 'W', while second camera 15 may obtain input frames that correspond to output frames denoted with a 'T'. As such, camera processor(s) 14 may initiate camera transition 902 in response to detecting a particular zoom level. In the example shown, camera processor(s) 14 may perform geometric warping during a first phase and may perform transition blending during a second phase, where the two phases are defined by camera transition 902. In addition, camera processor(s) 14 may decouple the two phases. In an illustrative and non-limiting example, camera processor(s) 14 may perform a pre-geometric warping phase, followed by a geometric warping phase, followed by a transition blending phase, followed by a post-transition blending process, such as a normal outflow process.

Figure 10:
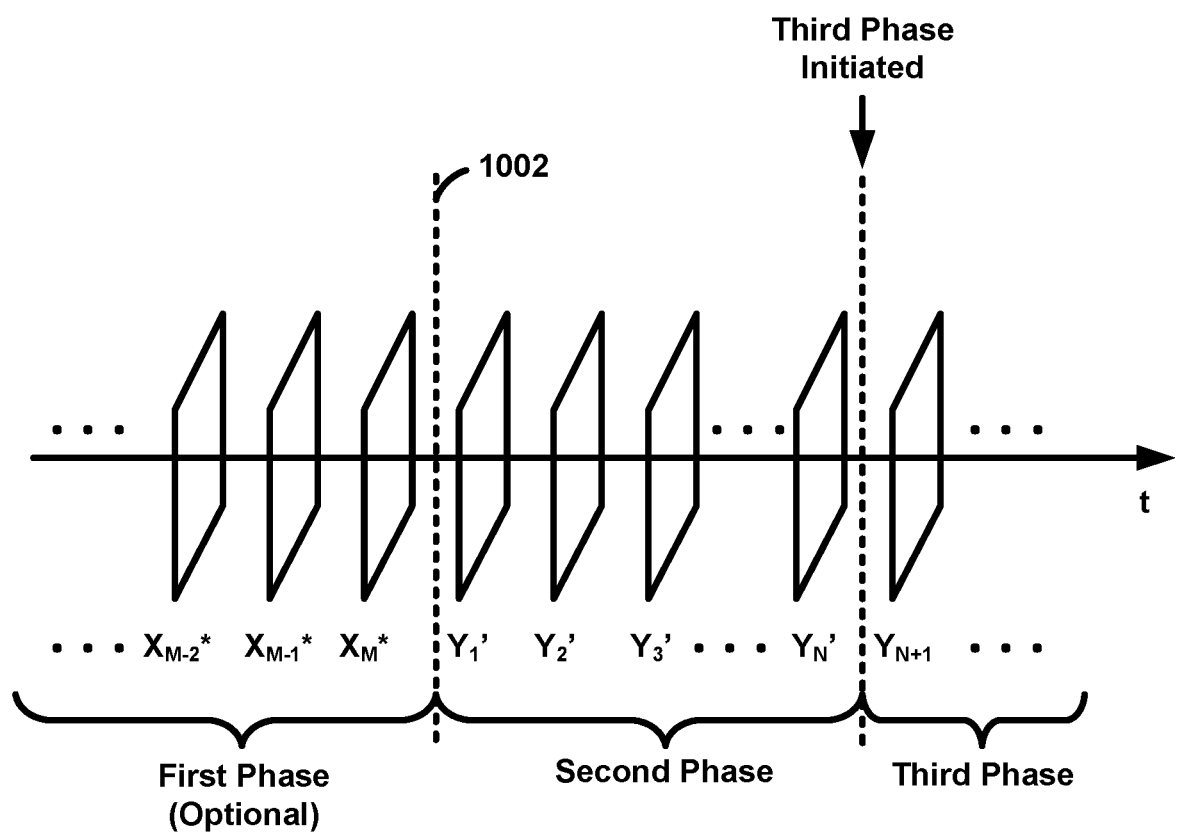
FIG. 10 is a conceptual diagram that illustrates an example camera transition and various phases that occur before and after the example camera transition, in accordance with various aspects of the techniques described in this disclosure.

FIG. 10 is a conceptual diagram that illustrates an example camera transition 1002 and various phases before and after camera transition 1002, in accordance with various aspects of the techniques described in this disclosure. While a specific sequence of operations is described, including various phases before and after camera transition 1002, the techniques of this disclosure are not so limited. As such, the examples described with reference to FIG. 10 are intended to illustrate an example sequence of operations that involve pixel blending operations that may precede camera transition 1002 and follow camera transition 1002. In the example depicted, first camera 15 may obtain input frames that correspond to output frames denoted with an 'X', while second camera 15 may obtain input frames that correspond to output frames denoted with a 'Y'. As such, camera processor(s) 14 may initiate camera transition 1002 in response to detecting a particular zoom level.

Camera processor(s) 14 may obtain a first set of image(s) from first camera 15 as part of a first optional phase. In some examples, the first optional phase may include a normal operating phase, a geometrical warping phase, a pixel unbinning phase, etc. In examples including the first optional phase, camera processor(s) 14 may obtain a first frame $X_M$ from first camera 15. Camera processor(s) 14 may perform the first phase of operations, including an operation on frame $X_M$ in anticipation of camera transition 1002. Camera processor(s) 14 may then initiate camera transition 1002 that effectively causes a switch to second camera 15, which obtains input frames in the second phase of operation. The second phase of operation may include a recursive blending of a finite set of frames obtained from second camera 15 following camera transition 1002 or otherwise may include a phase for transitioning photometric characteristics based on a frame obtained prior to camera transition 1002.

In an example, camera processor(s) 14 may start by blending pixels of a last frame of the phase that precedes camera transition 1002 with pixels of a first input frame ($Y_1$) that follows camera transition 1002. That is, camera processor(s) 14 blend pixels corresponding to geometrically warped frame $X_M$* with pixels from input frame $Y_1$ (not shown in this figure) to produce output frame $Y_1$'. In recursive fashion, camera processor(s) 14 may then blend frame $Y_1$' with input frame $Y_2$ (not shown in this figure) to produce $Y_2$', and so forth up until, if reached, $Y_N$ (not shown in this figure) and $Y_N$'. Camera processor(s) 14 may, in some instances, enter a third phase after a finite number of output frames of the second phase. The third phase may include a normal output phase, in which output frames mirror input frames, similar to the way in which output frames of the first phase mirror input frames of the first phase. In some examples, the third phase may or may not include geometric warping. Although geometrically warped frames have geometrically displaced pixels, the pixels of a geometrically warped frame may nevertheless mirror pixels of a corresponding input frame, such as in terms of pixel values, photometric characteristics, etc.

Figure 11:
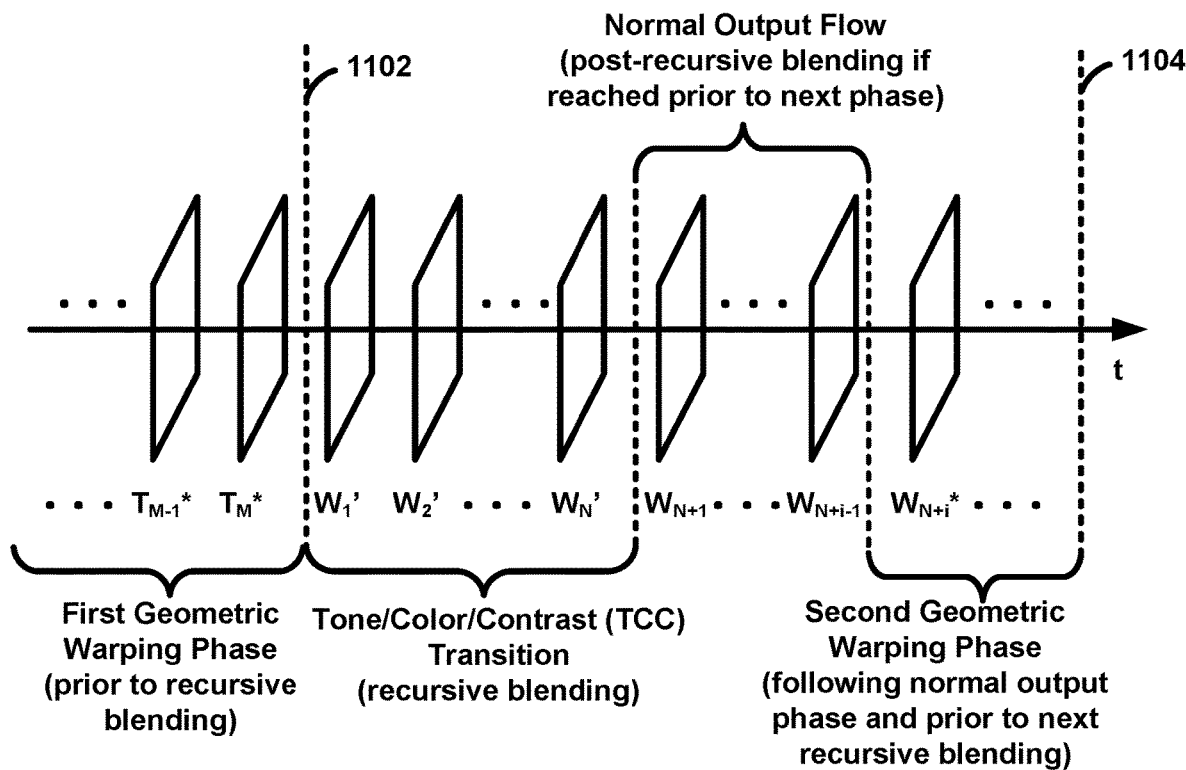
FIG. 11 is a conceptual diagram that illustrates example camera transitions and various phases including pixel blending and geometric warping phases, in accordance with various aspects of the techniques described in this disclosure.

FIG. 11 is a conceptual diagram that illustrates example camera transitions and various phases between, before, and after a first camera transition 1102 and a second camera transition 1104, in accordance with various aspects of the techniques described in this disclosure. While a specific sequence of operations is described, including various phases between first camera transition 1102 and second camera transition 1104, the techniques of this disclosure are not so limited. As such, the examples described with reference to FIG. 11 are intended to illustrate an example sequence of operations that involve operations that may precede camera transition 1102, follow camera transition 1102, and precede camera transition 1104. In the example depicted, first camera 15 may include a telephoto (T) camera and second camera 15 may include a wide-angle camera (W). As such, camera processor(s) 14 may initiate camera transition 1102 in response to a decreasing zoom level. In addition, camera processor(s) 14 may initiate camera transition 1104 in response to a decreasing or increasing zoom level.

Camera processor(s) 14 may obtain a first set of image(s) from first camera 15. In an example, camera processor(s) 14 may obtain a first frame $T_M$ from first camera 15. Camera processor(s) 14 may perform a geometrical warping of frames representing the first set of image(s) during a first geometric warping phase that camera processor(s) 14 perform prior to a recursive blending transition phase and prior to camera transition 1102. Camera processor(s) 14 may next initiate camera transition 1102 that effectively switches to second camera 15 obtaining input frames. In such examples, camera processor(s) 14 may perform recursive blending on a finite set of frames obtained from second camera 15 following camera transition 1102. In an example, camera processor(s) 14 may start by blending pixels of a last frame of the phase that precedes camera transition 1102 with pixels of a first input frame ($W_1$) that follows camera transition 1102. That is, camera processor(s) 14 blend pixels corresponding to geometrically warped frame $T_M$* with pixels from input frame $W_1$ (not shown in this figure) to produce output frame $W_1$'. In recursive fashion, camera processor(s) 14 may then proceed to blend frame $W_1$' with input frame $W_2$ (not shown in this figure) to produce $W_2$', and so forth up until, if reached, $W_N$ (not shown in this figure) and $W_N$'. As described herein, camera processor(s) 14 may determine the number of blended frames leading up to and including $W_N$' based on a tuning parameter, a blending weight coefficient 33, or based on a combination of both the tuning parameter and the blending weight coefficient 33.

In a non-limiting and illustrative example, camera processor(s) 14 may perform recursive blending as part of a TCC transition phase. Once the recursive blending phase is complete, such as at a last frame of the recursive blending phase ($W_N$'), camera processor(s) 14 may perform a normal output flow operation. The normal output flow operation may occur post-recursive blending if reached prior to a next phase, such as a geometric warping phase. That is, in some instances based on changes in a zooming direction (e.g., a change from zooming in to zooming out) and based on a proximity to a next camera transition, the normal output flow operation may not occur. Instead, camera processor(s) 14 may enter a second geometric warping phase. The second geometric warping phase may occur following the normal output phase (where camera processor(s) 14 have reached a normal output phase) and prior to a next recursive blending phase. The next recursive blending phase may commence at the initiation of second camera transition 1104. That is, camera processor(s) 14 may perform the second geometric warping phase in anticipation of second camera transition 1104 based on the next camera transition (e.g., back to first camera 15 and/or to a next camera 15).

Figure 12:
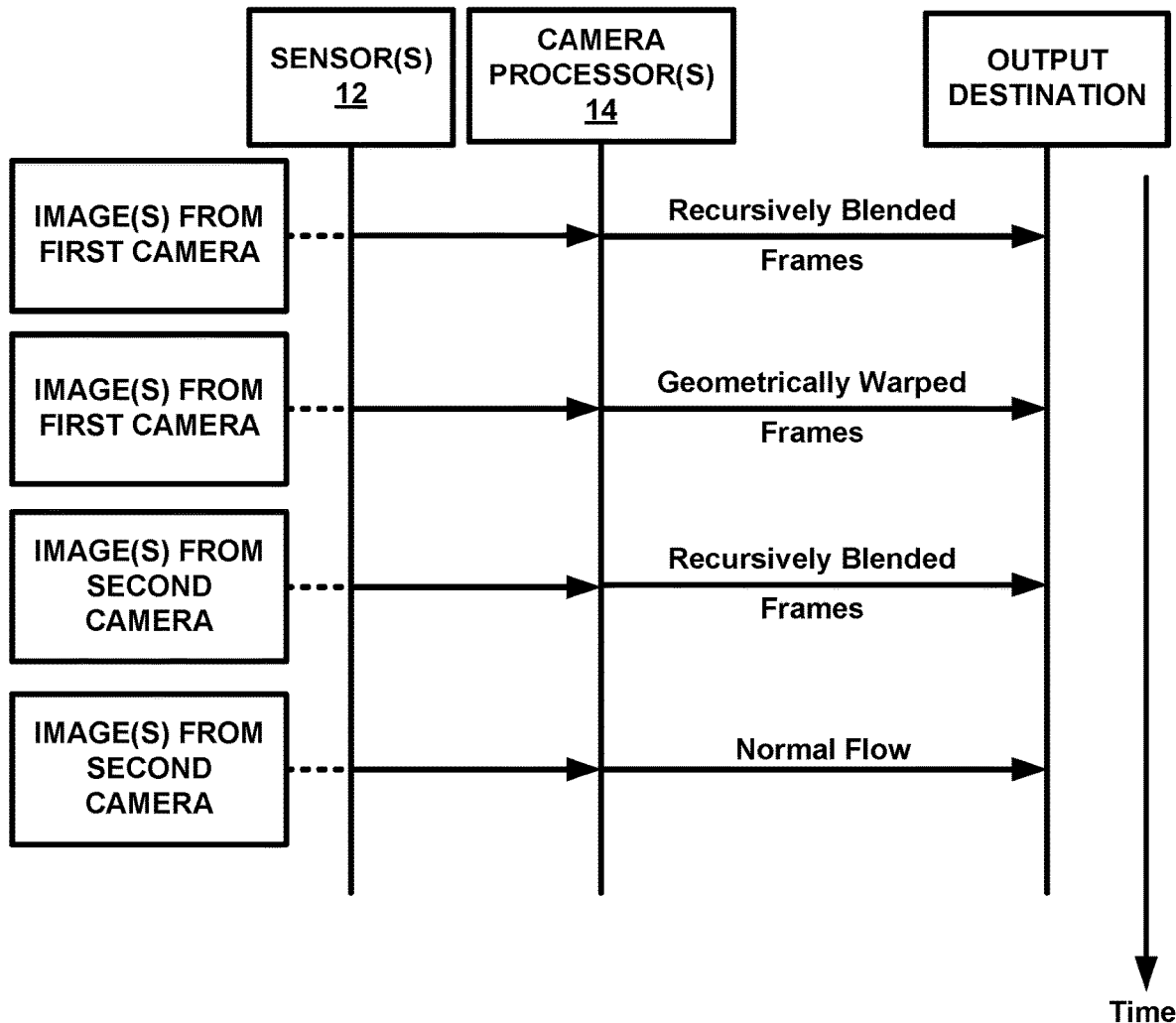
FIG. 12 is a timing diagram that illustrates example camera transition techniques, in accordance with various aspects of the techniques described in this disclosure.

FIG. 12 is a timing diagram that illustrates example camera transition techniques, in accordance with various aspects of the techniques described in this disclosure. While the timing diagram illustrates a specific sequence of operations, various modes (e.g., phases) between camera transitions, and specific outputs from camera processor(s) 14, the techniques of this disclosure are not so limited. As such, the examples described with reference to FIG. 12 are intended to illustrate an example sequence of operations that involve pixel blending operations that may follow camera transitions.

In some examples, camera processor(s) 14 may obtain a first set of image(s) from first camera 15. In an example, sensor(s) 12 may transfer a first set of pixel corresponding to a first set of frames to camera processor(s) 14. In some instances, sensor(s) 12 may transfer, to camera processor(s) 14, a number of pixels that correspond to the total number of pixels available from a respective image sensor 12 (e.g., 12 million pixels from a 12 MP (megapixel) image sensor 12). In some instances, however, sensor(s) 12 may transfer a reduced number of pixels relative to the total number of available pixels from the respective image sensor 12. For example, image sensor 12 may combine multiple pixels together into a reduced number of pixels (e.g., pixel binning) and/or may otherwise transfer, to camera processor(s) 14, only a portion of the total number of available pixels. In any case, camera processor(s) 14 may perform recursive pixel blending based on a frame obtained prior to a camera transition, such as a transition from second camera 15 to first camera 15. Camera processor(s) 14 may blend pixels of each subsequent frame (e.g., pixels received from sensor(s) 12) in a recursive fashion until either a change in direction of a zoom occurs (e.g., zoom-in to zoom-out) or until a normal flow operation is initiated at the conclusion of the transition blending phase.

Next, camera processor(s) 14 may obtain a second set of image(s) from first camera 15. Camera processor(s) 14 may determine, based on the zoom level, that a camera transition from first camera 15 to second camera 15 is likely to occur, such as if a particular zoom level increase continues in a particular direction and/or at a particular rate to a reach camera transition threshold. As such, camera processor(s) 14 may perform a geometrical warping of frames representing the second set of image(s).

Next, camera processor(s) 14 may obtain a third set of image(s) from second camera 15, such as in response to a camera transition from first camera 15 to second camera 15. Camera processor(s) 14 may perform recursive blending of frames representing the third set of image(s). In an example, camera processor(s) 14 may utilize a first frame from the second set of image(s) to initiate a recursive blending function, such that pixel contributions from the first frame proliferate throughout the recursively blended frames.

Next, camera processor(s) 14 may determine a triggering event configured to signal camera processor(s) 14 to stop recursively blending frames, such as those represented by the third set of image(s) in this example. As such, camera processor(s) 14 may receive a fourth set of image(s) from second camera 15 and may initiate a normal output flow that outputs frames representing the fourth set of image(s) that, as part of the normal output flow, are not blended as part of transition blending. In each instance, camera processor(s) 14 may output the first set of images(s) through the fourth set of images(s) to one or more output destinations (e.g., video encoder/decoder 17, display interface 26, system memory 30, etc.). The camera processor(s) 14 may output the first set of images(s) through the fourth set of images(s) as a collection of blended and unblended frames with varying degrees of geometrical warping prior to camera transitions.

A person of skill in the art will understand that image captures may include a snapshot capture, capture for preview display, or a video stream capture. For example, one or more cameras 15 of computing device 10 may implement the blending operations, described with reference to FIGS. 1-12, while coding video, while taking a still photo following a zoom operation or while recording video (e.g., pictures-in-video), providing an image preview (e.g., before a user takes a photo or video, while a user takes a video or photo, etc.), while capturing motion photos, while a user takes a video, while storing video to system memory 30, etc.

Illustrative examples of the disclosure include:

Example 1: An apparatus configured for camera processing, the apparatus comprising: a memory; and one or more processors in communication with the memory, the one or more processors configured to: in response to a camera transition from a first camera to a second camera, blend pixels of a first frame with pixels of a second frame to produce a first blended frame, the first frame being captured via the first camera, and the second frame being captured in succession with the first frame via the second camera; and output the first blended frame after the first frame.

Example 2: An apparatus according to Example 1, wherein to blend pixels of the first frame with pixels of the second frame, the one or more processors are configured to: blend a first pixel of the first frame with a corresponding first pixel of the second frame to produce the first blended frame, wherein the first blended frame comprises a blended pixel that comprises a first contribution level from the first pixel of the first frame and a second corresponding contribution level from the first pixel of the second frame.

Example 3: An apparatus according to any one of Examples 1 or 2, wherein the one or more processors are further configured to: obtain a third frame subsequent to the second frame; blend pixels of the first blended frame with pixels of the third frame to produce a second blended frame; and output the second blended frame in succession with the first blended frame.

Example 4: An apparatus according to Example 3, wherein to blend pixels of the first blended frame with pixels of the third frame, the one or more processors are configured to: blend a first pixel of the first blended frame with a corresponding first pixel of the third frame to produce the second blended frame.

Example 5: An apparatus according to any one of Examples 3 or 4, wherein the one or more processors are further configured to: align the first blended frame with the third frame prior to blending pixels of the first blended frame with pixels of the third frame.

Example 6: An apparatus according to Example 5, wherein to align the first blended frame with the third frame, the one or more processors are further configured to: warp the first blended frame to align with corresponding pixels of the third frame.

Example 7: An apparatus according to any one or more of Examples 1 through 6, wherein the one or more processors are further configured to: obtain the first frame via a first lens; output, prior to the camera transition, the first frame; obtain the second frame via a second lens; and align the first frame with the second frame prior to blending pixels of the first frame with pixels of the second frame.

Example 8: An apparatus according to Example 7, wherein to output the first frame, the one or more processors are configured to: cause a geometrical warping of the first frame pursuant to a first warping period that extends up until the camera transition; and output the first frame comprising the geometrical warping.

Example 9: An apparatus according to Example 8, wherein the blended frames produced following the camera transition comprise a different field of view compared to that of an unblended frame obtained during the first warping period.

Example 10: An apparatus according to any one or more of Examples 1 through 9, wherein to blend pixels of the first frame with pixels of the second frame, the one or more processors are configured to: apply a blending function that determines pixel contribution levels as follows: $Y_1' = \alpha(X_M^*) + (1-\alpha)Y_1$, wherein: $Y_1'$ represents the first blended frame, $X_M^*$ represents the first frame with geometrical warping, $Y_1$ represents the second frame, and $\alpha$ represents a blending weight that follows: $0 \leq \alpha \leq 1$.

Example 11: An apparatus according to Example 10, wherein $X_M^*$ comprises a geometrically warped frame that the first camera captures prior to the camera transition, wherein the camera transition initiates the application of the blending function that results in a blending of pixels from two input frames to produce a blended output frame.

Example 12: An apparatus according to any one of Examples 10 or 11, wherein the one or more processors are further configured to: blend pixels of the first blended frame with pixels of a plurality of successive frames based on a recursive blending function that follows: $Y_2'=\alpha(Y_1')+(1-\alpha)Y_2$, wherein: $Y_2'$ represents a second blended frame, $Y_1'$ represents the first blended frame, and $Y_2$ represents an incoming frame (e.g., a third frame).

Example 13: An apparatus according to any one or more of Examples 10 through 12, wherein the one or more processors are further configured to: determine, automatically, or based on manual input, or both, a value to assign the blending weight.

Example 14: An apparatus according to any one or more of Examples 1 through 13, wherein the one or more processors are further configured to: obtain an $n^{th}$ frame subsequent to the second frame; and output the $n^{th}$ frame as a last blended frame of a blending transition process, wherein the blending transition process initiates with the blending of the first frame and the second frame, and wherein the last blended frame includes a lower pixel contribution of pixels from the first frame relative to a blended output frame that precedes the last blended frame in the blending transition process.

Example 15: An apparatus according to Example 14, wherein the lower pixel contribution includes a cascading pixel contribution that cascades pixel contributions throughout successively blended frames via the blending transition process.

Example 16: An apparatus according to any one of Examples 14 or 15, wherein to output the $n^{th}$ frame as the last blended frame of the blending transition process, the one or more processors are configured to: determine that a predefined number of frames have been obtained or that a predefined duration of time has elapsed since the initiation of the blending transition process, or determine that the lower pixel contribution of pixels from the first frame comprises a value that satisfies a predefined pixel contribution threshold.

Example 17: An apparatus according to any one or more of Examples 14 through 16, wherein the one or more processors are further configured to: obtain a frame that follows the $n^{th}$ frame; and pursuant to a camera mode that initiates following a blending of the $n^{th}$ frame, output the frame that follows the $n^{th}$ frame as an unblended frame.

Example 18: An apparatus according to any one or more of Examples 1 through 17, wherein the one or more processors are further configured to: perform a global 3A synchronization process on each of a plurality of frames, the plurality of frames including the first frame and the first blended frame, wherein blending the plurality of frames comprises a pixel level blending at the local pixel level for each pair of frames of the plurality of frames that are subject to blending with one another.

Example 19: An apparatus according to any one or more of Examples 1 through 18, wherein to output the first blended frame, the one or more processors are configured to: output, to a video encoder/decoder, the first frame and the first blended frame.

Example 20: An apparatus according to any one or more of Examples 1 through 19, wherein to output the first blended frame, the one or more processors are configured to: output the first blended frame to system memory or to a display device.

Example 21: An apparatus according to any one or more of Examples 1 through 20, wherein the one or more processors are further configured to: detect a change in zoom direction subsequent to the camera transition; and in response to detecting the change, output a plurality of subsequent frames pursuant to a second camera process, the second camera process separate and distinct from the blending initiated at the camera transition.

Example 22: An apparatus according to any one or more of Examples 1 through 21, wherein the first camera comprises a first field of view, and wherein the second camera comprises a second field of view disposed within the first field of view.

Example 23: An apparatus according to any one or more of Examples 1 through 22, wherein the first camera comprises a first focal length, and wherein the second camera comprises a second focal length.

Example 24: An apparatus according to any one or more of Examples 1 through 23, wherein the camera transition comprises a lens transition or an image sensor transition.

Example 25: An apparatus according to any one or more of Examples 1 through 24, wherein the one or more processors are further configured to: cause the camera transition by deactivating the first camera prior to blending the second frame with the first frame.

Example 26: A method for camera processing, the method comprising: in response to a camera transition from a first camera to a second camera, blending pixels of a first frame with pixels of a second frame to produce a first blended frame, the first frame being captured via the first camera, and the second frame being captured in succession with the first frame via the second camera; and outputting the first blended frame after the first frame.

Example 27: A method according to Example 26, wherein blending pixels of the first frame with pixels of the second frame comprises: blending a first pixel of the first frame with a corresponding first pixel of the second frame to produce the first blended frame, wherein the first blended frame comprises a blended pixel that comprises a first contribution level from the first pixel of the first frame and a second corresponding contribution level from the first pixel of the second frame.

Example 28: A method according to any one of Examples 26 or 27, further comprising: obtaining, via the second camera, a third frame subsequent to the second frame; blending pixels of the first blended frame with pixels of the third frame to produce a second blended frame; and outputting the second blended frame in succession with the first blended frame.

Example 29: A method according to Example 28, wherein blending pixels of the first blended frame with pixels of the third frame comprises: blending a first pixel of the first blended frame with a corresponding first pixel of the third frame to produce the second blended frame.

Example 30: A method according to any one of Examples 28 or 29, further comprising: aligning the first blended frame with the third frame prior to blending pixels of the first blended frame with pixels of the third frame.

Example 31: A method according to Example 30, wherein aligning the first blended frame with the third frame comprises: warping the first blended frame to align with corresponding pixels of the third frame.

Example 32: A method according to any one or more of Examples 26 through 31, further comprising: obtaining the first frame via the first camera; outputting, prior to the camera transition, the first frame; obtaining the second frame via the second camera; and aligning the first frame with the second frame prior to blending pixels of the first frame with pixels of the second frame.

Example 33: A method according to Example 32, wherein outputting the first frame further comprises: causing a geometrical warping of the first frame pursuant to a first warping mode that extends up until the camera transition; and outputting the first frame comprising the geometrical warping.

Example 34: A method according to Example 33, wherein the blended frames produced following the camera transition comprise a different field of view compared to that of an unblended frame obtained via the first camera during the first warping mode.

Example 35: A method according to any one or more of Examples 26 through 34, wherein blending pixels of the first frame with pixels of the second frame comprises: applying a blending function that determines pixel contribution levels as follows: $Y_1'=\alpha(X_M^*)+(1-\alpha)Y_1$, wherein: $Y_1'$ represents the first blended frame, $X_M^*$ represents the first frame with geometrical warping, $Y_1$ represents the second frame, and $\alpha$ represents a blending weight that follows: $0 \leq \alpha \leq 1$.

Example 36: A method according to Example 35, wherein $X_M^*$ comprises a geometrically warped frame that the first camera captures prior to the camera transition, wherein the camera transition initiates the application of the blending function that results in a blending of pixels from two input frames to produce a single blended output frame.

Example 37: A method according to any one of Examples 35 or 36, further comprising: blending the first blended frame with successive frames obtained via the second camera by applying a recursive blending function as follows: $Y_2'=\alpha(Y_1')+(1-\alpha)Y_2$, wherein: $Y_2'$ represents a second blended frame, $Y_1'$ represents the first blended frame, and $Y_2$ represents a first successive frame obtained via the second camera, the first successive frame following the second frame.

Example 38: A method according to any one or more of Examples 35 through 37, further comprising: determining a value of the blending weight.

Example 39: A method according to any one or more of Examples 26 through 38, further comprising: obtaining an $n^{th}$ frame subsequent to the second frame; and outputting the $n^{th}$ frame as a last blended frame of a blending transition process, wherein the blending transition process initiates with the blending of the first frame and the second frame, and wherein the last blended frame includes a lower pixel contribution of pixels from the first frame relative to a subsequent frame of the blending transition process.

Example 40: A method according to Example 39, wherein the lower pixel contribution includes a cascading pixel contribution that cascades via the blending transition process.

Example 41: A method according to any one of Examples 39 or 40, wherein outputting the $n^{th}$ frame as the last blended frame of the blending transition process comprises: determining that a predefined number of frames have been obtained or that a predefined duration of time has elapsed since the initiation of the blending transition process, or determining that the lower pixel contribution of pixels from the first frame comprises a value that satisfies a predefined pixel contribution threshold.

Example 42: A method according to any one or more of Examples 39 through 41, further comprising: obtaining an $n^{th}+1$ frame via the second camera; and pursuant to a camera mode that initiates following a blending of the $n^{th}$ frame, outputting the $n^{th}+1$ frame as an unblended frame in succession with the last blended frame.

Example 43: A method according to any one or more of Examples 26 through 42, further comprising: performing a global 3A synchronization process on each of a plurality of frames, the plurality of frames including the first frame and the first blended frame, wherein blending the plurality of frames comprises a pixel level blending at the local pixel level for each pair of frames of the plurality of frames that are subject to blending with one another.

Example 44: A method according to any one or more of Examples 26 through 43, wherein outputting the first blended frame comprises: outputting, to a video encoder/decoder, the first frame and the first blended frame.

Example 45: A method according to any one or more of Examples 26 through 44, wherein, with geometrical warping, the first frame is output for display as a first output frame, and subsequent to output of the first frame, the first blended frame is output for display as a second output frame that follows in succession the first output frame.

Example 46: A method according to any one or more of Examples 26 through 45, further comprising: detecting a change in zoom direction subsequent to the camera transition; and outputting a plurality of subsequent frames pursuant to a second camera process, the second camera process separate and distinct from frame blending.

Example 47: A method according to any one or more of Examples 26 through 46, wherein the first camera comprises a first field of view, and wherein the second camera comprises a second field of view disposed within the first field of view.

Example 48: A method according to any one or more of Examples 26 through 47, wherein the first camera comprises a first focal length, and wherein the second camera comprises a second focal length.

Example 49: A method according to any one or more of Examples 26 through 48, wherein the camera transition comprises a transition from a first lens to a second lens.

Example 50: A method according to any one or more of Examples 26 through 49, further comprising: causing the camera transition by deactivating the first camera.

Example 51: An apparatus configured for camera processing, the apparatus comprising: means for blending, in response to a transition from a first camera to a second camera, a first set of pixels of a first frame with a second set of pixels of a second frame to produce a first blended frame, the first frame being captured via the first camera, and the second frame being captured in succession with the first frame via the second camera; and means for outputting the first blended frame after the first frame.

Example 52: An apparatus according to Example 51, wherein the means for blending the first set of pixels with the second set of pixels comprises: means for blending a first pixel of the first set of pixels with a corresponding first pixel of the second set of pixels.

Example 53: An apparatus according to any one of Examples 51 or 52, further comprising: means for obtaining a third frame; and means for blending the first blended frame with the third frame to produce a second blended frame.

Example 54: An apparatus according to Example 53, wherein the means for blending the first blended frame with the third frame comprises: means for blending pixels of the first blended frame with corresponding pixels of the third frame.

Example 55: An apparatus according to any one of Examples 53 or 54, further comprising: means for aligning the first blended frame and the third frame together with one another.

Example 56: An apparatus according to Example 55, wherein the means for aligning the first blended frame and the third frame comprises: means for warping the first blended frame.

Example 57: An apparatus according to any one or more of Examples 51 through 56, further comprising: means for obtaining the first frame from the first camera; means for outputting the first frame; means for obtaining the second frame; and means for aligning the first frame with the second frame.

Example 58: An apparatus according to Example 57, wherein the means for outputting the first frame comprises: means for outputting the first frame comprising a geometrical warping.

Example 59: An apparatus according to Examples 51 through 58, wherein the blended frames produced following the camera transition comprise a different field of view compared to unblended frames obtained prior to the camera transition.

Example 60: An apparatus according to any one or more of Examples 51 through 59, wherein the means for blending the first set of pixels with the second set of pixels comprises: means for applying a blending function that determines pixel contribution levels according to a blending weight and a corresponding inverse blending weight that together total a maximum pixel contribution relative to a third set of pixels of the first blended frame.

Example 61: An apparatus according to Example 60, further comprising: means for tuning the blending weight.

Example 62: An apparatus according to any one or more of Examples 51 through 61, wherein the first frame comprises a geometrically warped frame, and wherein the camera transition initiates blending of the first frame and the second frame.

Example 63: An apparatus according to any one or more of Examples 51 through 62, further comprising: means for blending the first blended frame with successive frames obtained from the second camera via a recursive blending function, wherein the first blended frame that comprises a pixel contribution from the first frame and the second frame is blended together with a first successive frame (e.g., a third frame) to produce a second blended frame, and wherein the second blended frame is blended together with a next successive frame to produce a third blended frame.

Example 64: An apparatus according to any one or more of Examples 51 through 63, further comprising: means for obtaining an $n^{th}$ frame subsequent to the second frame; and means for outputting the $n^{th}$ frame as a last blended frame of a blending transition process.

Example 65: An apparatus according to any one or more of Examples 51 through 64, further comprising: means for cascading pixel contributions throughout successively blended frames.

Example 66: An apparatus according to any one of Examples 64 or 65, wherein the means for outputting the $n^{th}$ frame as the last blended frame comprises: means for determining that a predefined number of frames have been obtained or that a predefined duration of time has elapsed since the initiation of the blending transition process, or means for determining that a contribution of the first frame has, since the initiation of the blending transition process, diluted to a predefined contribution level.

Example 67: An apparatus according to any one or more of Examples 64 through 66, further comprising: means for obtaining an $n^{th}+1$ frame; and outputting the $n^{th}+1$ frame as an unblended frame in succession with the last blended frame.

Example 68: An apparatus according to any one or more of Examples 51 through 67, further comprising: means for performing a global 3A synchronization process on each of a plurality of frames, the plurality of frames including the first frame and the first blended frame; and means for blending pixels of the plurality of frames at a local pixel level.

Example 69: An apparatus according to any one or more of Examples 51 through 68, wherein the means for outputting the first blended frame comprises: means for outputting the first frame and the first blended frame to a video encoder/decoder.

Example 70: An apparatus according to any one or more of Examples 51 through 69, wherein the means for outputting the first blended frame comprises: means for outputting the first blended frame to system memory or to a display device.

Example 71: An apparatus according to any one or more of Examples 51 through 70, further comprising: means for detecting a change in zoom direction subsequent to the camera transition; and in response to detecting the change, means for outputting a plurality of subsequent frames pursuant to a second camera process.

Example 72: An apparatus according to any one or more of Examples 51 through 71, wherein the first camera comprises a first field of view, and wherein the second camera comprises a second field of view disposed within the first field of view.

Example 73: An apparatus according to any one or more of Examples 51 through 72, further comprising: means for transitioning from a first focal length to a second focal length.

Example 74: An apparatus according to any one or more of Examples 51 through 73, wherein the first camera comprises the first focal length, and wherein the second camera comprises the second focal length.

Example 75: An apparatus according to any one or more of Examples 51 through 73, further comprising: means for deactivating the first camera concurrently while activating the second camera, or means for activating the second camera prior to a deactivation of the first camera.

Examples 76: A non-transitory computer-readable storage medium having stored thereon instructions that, when executed, cause one or more processors to: blend, in response to a camera transition from a first camera to a second camera, pixels of a first frame with pixels of a second frame to produce a first blended frame, the first frame captured via the first camera, and the second frame captured via the second camera; obtain a third frame captured via the second camera; and blend pixels of the first blended frame with pixels of the third frame to produce a second blended frame.

Example 77: A non-transitory computer-readable storage medium according to Example 76, wherein to blend pixels of the first frame with pixels of the second frame, the one or more processors are caused to: blend a first pixel of the first frame with a corresponding first pixel of the second frame to produce the first blended frame, wherein the first blended frame comprises a blended pixel that comprises a first contribution level from the first pixel of the first frame and a second corresponding contribution level from the first pixel of the second frame.

Example 78: A non-transitory computer-readable storage medium according to any one of Examples 76 or 77, wherein the one or more processors are further caused to: output the first blended frame; and output the second blended frame after the first blended frame.

Example 79: The non-transitory computer-readable storage medium of any one or more of claims 76 through 78, wherein to blend pixels of the first blended frame with pixels of the third frame, the one or more processors are caused to: blend, for each pixel of a first plurality of pixels of the first blended frame and each corresponding pixel of a corresponding second plurality of pixels of the third frame, the first plurality of pixels and the corresponding second plurality of pixels.

Example 80: A non-transitory computer-readable storage medium of any one or more of Examples 76 through 79, wherein the one or more processors are further caused to: align the first blended frame with the third frame prior to blending pixels of the first blended frame with pixels of the third frame.

Example 81: A non-transitory computer-readable storage medium according to Example 80, wherein to align the first blended frame with the third frame, the one or more processors are caused to: warp the first blended frame to align with corresponding pixels of the third frame.

Example 82: A non-transitory computer-readable storage medium of any one or more of Examples 76 through 81, wherein the one or more processors are further caused to: obtain the first frame via a first image sensor; output, prior to the camera transition, the first frame; obtain the second frame via a second image sensor; and align the first frame with the second frame prior to blending pixels of the first frame with pixels of the second frame.

Example 83: A non-transitory computer-readable storage medium according to Example 82, wherein to output the first frame, the one or more processors are caused to: output the first frame as a geometrically warped frame.

Example 84: A non-transitory computer-readable storage medium according to Examples 76 through 83, wherein the blended frames produced following the camera transition comprise a different field of view compared to that of a preceding unblended frame.

Example 85: A non-transitory computer-readable storage medium of any one or more of Examples 76 through 84, wherein to blend pixels of the first frame with pixels of the second frame, the one or more processors are caused to: apply a blending function that determines pixel contribution levels as follows: $Y_1'=\alpha(X_M^*)+(1-\alpha)Y_1$, wherein: $Y_1'$ represents the first blended frame, $X_M^*$ represents the first frame with geometrical warping, $Y_1$ represents the second frame, and $\alpha$ represents a blending weight that follows: $0 \leq \alpha \leq 1$.

Example 86: A non-transitory computer-readable storage medium according to Example 85, wherein to apply the blending function, the one or more processors are caused to: initiate the blending function in response to the camera transition.

Example 87: A non-transitory computer-readable storage medium according to any one of Examples 85 or 86, wherein the one or more processors are further caused to: blend the third frame with first blended frame to obtain a second blended frame as follows: $Y_2'=\alpha(Y_1')+(1-\alpha)Y_2$, wherein: $Y_2'$ represents the second blended frame, $Y_1'$ represents the first blended frame, $Y_2$ represents the third frame, and $\alpha$ represents the blending weight.

Example 88: A non-transitory computer-readable storage medium of any one or more of Examples 85 through 87, wherein the one or more processors are further caused to: automatically determine a value for the blending weight.

Example 89: A non-transitory computer-readable storage medium of any one or more of Examples 76 through 88, wherein the one or more processors are further caused to: obtain an $n^{th}$ frame subsequent to the second frame; and output the $n^{th}$ frame as a last blended frame.

Example 90: A non-transitory computer-readable storage medium according to Example 89, wherein output of the $n^{th}$ frame comprises a last output of a recursive blending mode prior to a next camera mode separate and distinct from the recursive blending mode.

Example 91: A non-transitory computer-readable storage medium according to any one of Examples 89 or 90, wherein to output the $n^{th}$ frame as the last blended frame, the one or more processors are caused to: determine that a predefined number of blended frames have been obtained or that a predefined duration of time has elapsed since the camera transition, or determine that an amount the first frame contributes to the $n^{th}$ frame satisfies a predefined contribution threshold.

Example 92: A non-transitory computer-readable storage medium of any one or more of Examples 89 through 91, wherein the one or more processors are further caused to: obtain an $n^{th}+1$ frame; and output the $n^{th}+1$ frame as an unblended frame that follows the last blended frame.

Example 93: A non-transitory computer-readable storage medium of any one or more of Examples 76 through 92, wherein the one or more processors are further caused to: perform a global 3A synchronization process on each of a plurality of frames, the plurality of frames including the first frame and the first blended frame.

Example 94: A non-transitory computer-readable storage medium of any one or more of Examples 76 through 93, wherein to output the first blended frame, the one or more processors are caused to: output, to a video encoder/decoder, the first frame and the first blended frame.

Example 95: A non-transitory computer-readable storage medium of any one or more of Examples 76 through 94, wherein to output the first blended frame, the one or more processors are caused to: output the first frame and the first blended frame to a display device.

Example 96: A non-transitory computer-readable storage medium of any one or more of Examples 76 through 95, wherein the one or more processors are further caused to: detect a change in zoom direction after the second frame is obtained; and cease producing blended frames that are based on any blended frames previously produced.

Example 97: A non-transitory computer-readable storage medium of any one or more of Examples 76 through 96, wherein the first camera comprises a first field of view, and wherein the second camera comprises a second field of view.

Example 98: A non-transitory computer-readable storage medium of any one or more of Examples 76 through 97, wherein the first camera comprises a first focal length, and wherein the second camera comprises a second focal length.

Example 99: A non-transitory computer-readable storage medium of any one or more of Examples 76 through 98, wherein the camera transition comprises an image sensor transition.

Example 100: A non-transitory computer-readable storage medium of any one or more of Examples 76 through 99, wherein the one or more processors are further caused to: activate the second camera prior to the capture of the first frame.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured for camera processing, the apparatus comprising:
   a memory; and
   one or more processors in communication with the memory, the one or more processors configured to:
      receive a signal to transition from a first mode to a second mode, wherein a first frame is received via a first camera of the apparatus when the apparatus is operating in the first mode, and wherein a second frame is received via a second camera of the apparatus when the apparatus is operating in the second mode;
      receive the first frame via the first camera when the apparatus is operating in the first mode;
      output the first frame;
      transition from the first mode to the second mode after outputting the first frame;
      receive the second frame via the second camera when the apparatus is operating in the second mode;
      subsequent to the transition, blend one or more pixels of the first frame with one or more pixels of the second frame to produce a first blended frame;
      output the first blended frame after the first frame;
      receive, after the second frame, a third frame from the second camera when the apparatus is operating in the second mode;
      blend one or more pixels of the first blended frame with one or more pixels of the third frame to produce a second blended frame; and
      output the second blended frame after the first blended frame.

2. The apparatus of claim 1, wherein to blend pixels of the first frame with pixels of the second frame, the one or more processors are configured to:
   blend a first pixel of the one or more pixels of the first frame with a corresponding first pixel of the one or more pixels of the second frame to produce one or more blended pixels of the first blended frame.

3. The apparatus of claim 1, wherein the one or more processors are further configured to:
   warp the first frame, wherein warping the first frame further provides spatial alignment between the one or more pixels of the first frame and the one or more pixels of the second frame.

4. The apparatus of claim 1, wherein to blend the one or more pixels of the first frame with the one or more pixels of the second frame, the one or more processors are configured to:
   apply a blending function that determines pixel contribution levels as follows:

$$Y_1' = \alpha(X_M^*) + (1-\alpha)Y_1,$$

wherein:
   $Y_1'$ represents the first blended frame,
   $X_M^*$ represents the first frame with geometrical warping,
   $Y_1$ represents the second frame, and
   $\alpha$ represents a blending weight.

5. The apparatus of claim 4, wherein $X_M^*$ comprises a geometrically warped frame that the first camera receives prior to initiation of the second mode that follows the signal.

6. The apparatus of claim 4, wherein the one or more processors are further configured to:

blend one or more blended pixels of the first blended frame with pixels of a plurality of successive frames based on a recursive blending function that follows:

$$Y_2'=\alpha(Y_M^*)+(1-\alpha)Y_1,$$

wherein:
Y$_2$' represents the second blended frame,
Y$_1$' represents the first blended frame, and
Y$_2$ represents the third frame.

7. The apparatus of claim 1, wherein the one or more processors are further configured to:
receive an n$^{th}$ frame from the second camera, the n$^{th}$ frame received subsequent to the second frame;
determine (i) that a predefined number of frames have been obtained, or (ii) that a predefined duration of time has elapsed, relative to the transition from the first mode to the second mode; and
output the n$^{th}$ frame as a last blended frame of a blending transition process, wherein the blending transition process initiates with the blending of the first frame and the second frame.

8. The apparatus of claim 1, wherein the first frame represents image data captured pursuant to a first zoom level, and wherein the second frame represents image data captured pursuant to a second zoom level, wherein the first zoom level differs from the second zoom level.

9. The apparatus of claim 1, wherein the first camera is configured to image a scene at an effective first focal length, and wherein the second camera is configured to image the scene at an effective second focal length, wherein the first effective focal length of the first camera differs from the second effective focal length of the second camera.

10. The apparatus of claim 1, wherein the one or more processors are further configured to:
prior to blending the one or more pixels of the first frame with the one or more pixels of the second frame, transition from the first mode to the second mode by altering a power state of the first camera.

11. A method for camera processing, the method comprising:
receiving, by one or more processors, a signal to transition from a first mode to a second mode, wherein a first frame is received via a first camera configured to operate pursuant to the first mode, and wherein a second frame is received via a second camera configured to operate pursuant to the second mode;
receiving, by the one or more processors, the first frame via the first camera when operating in the first mode;
outputting, by the one or more processors, the first frame;
transitioning, by the one or more processors, from the first mode to the second mode after outputting the first frame;
receiving, by the one or more processors, the second frame via the second camera when operating in the second mode;
subsequent to transitioning from the first mode to the second mode, blending, by the one or more processors, one or more pixels of the first frame with one or more pixels of the second frame to produce one or more blended pixels of a first blended frame;
outputting, by the one or more processors, the first blended frame after the first frame;
receiving, by the one or more processors, and after the second frame, a third frame from the second camera when operating in the second mode;
blending, by the one or more processors, one or more pixels of the first blended frame with one or more pixels of the third frame to produce a second blended frame; and
outputting, by the one or more processors, the second blended frame after the first blended frame.

12. The method of claim 11, wherein blending the one or more pixels of the first frame with the one or more pixels of the second frame comprises:
blending, by the one or more processors, a first pixel of the one or more pixels of the first frame with a corresponding first pixel of the one or more pixels of the second frame to produce a first blended pixel of the one or more blended pixels of the first blended frame.

13. The method of claim 11, wherein blending, by the one or more processors, the one or more pixels of the first blended frame with the one or more pixels of the third frame comprises:
blending, by the one or more processors, a first pixel of the one or more blended pixels of the first blended frame with a corresponding first pixel of the one or more pixels of the third frame to produce a first blended pixel of the second blended frame.

14. The method of claim 11, wherein the first frame represents image data received at a first zoom level, and wherein the second frame represents image data received at a second zoom level, wherein the first zoom level differs from the second zoom level.

15. The method of claim 11, wherein blending, by the one or more processors, the one or more pixels of the first frame with the one or more pixels of the second frame comprises:
applying, by the one or more processors, a blending function that determines pixel contribution levels as follows:

$$Y_1'=\alpha(X_M^*)+(1-\alpha)Y_1,$$

wherein:
Y$_1$' represents the first blended frame,
X$_M^*$ represents the first frame with geometrical warping,
Y$_1$ represents the second frame, and
α represents a blending weight.

16. The method of claim 15, wherein X$_M^*$ comprises a geometrically warped frame that the first camera produces prior to the transition from the first mode to the second mode, wherein the transition from the first mode to the second mode initiates the application of the blending function that results in a blending of pixels from two input frames to produce a single blended output frame.

17. The method of claim 15, further comprising:
blending, by the one or more processors, the first blended frame with the third frame obtained via the second camera by applying a recursive blending function as follows:

$$Y_2'=\alpha(Y_1^*)+(1-\alpha)Y_2,$$

wherein:
Y$_2$' represents the second blended frame,
Y$_1$' represents the first blended frame, and
Y$_2$ represents the third frame.

18. The method of claim 11, further comprising:
receiving, by the one or more processors, an n$^{th}$ frame from the second camera, the n$^{th}$ frame received subsequent to the second frame;
determining, by the one or more processors, (i) that a predefined number of frames have been obtained, or (ii)

that a predefined duration of time has elapsed, relative to the transition from the first mode to the second mode; and outputting, by the one or more processors, the $n^{th}$ frame as a last blended frame of a blending transition process, wherein the last blended frame includes a lower pixel contribution of pixels from the first frame relative to a subsequent frame of the blending transition process.

19. The method of claim 11, wherein the first frame represents image data captured pursuant to a first zoom level, and wherein the second frame represents image data captured pursuant to a second zoom level, wherein the first zoom level is different than the second zoom level.

20. A non-transitory computer-readable storage medium having stored thereon instructions that, when executed, cause one or more processors to:

receive a signal to transition from a first camera mode to a second camera mode, wherein a first frame is received by the one or more processors when the one or more processors are operating pursuant to the first camera mode, and wherein a second frame is received by the one or more processors when the one or more processors are operating pursuant to the second camera mode, wherein the first camera mode and the second camera mode are different from one another;

receive the first frame via the first camera when the one or more processors are operating in the first mode;

output the first frame;

transition from the first mode to the second mode after outputting the first frame;

receive the second frame via the second camera when the one or more processors are operating in the second mode;

blend, subsequent to the transition, one or more pixels of the first frame with one or more pixels of the second frame to produce a first blended frame comprising one or more blended pixels;

output the first blended frame after the first frame;

receive, after the second frame, a third frame from the second camera when the one or more processors are operating in the second mode;

blend the one or more blended pixels of the first blended frame with one or more pixels of the third frame to produce a second blended frame; and output the second blended frame after the first blended frame.

21. The non-transitory computer-readable storage medium of claim 20, wherein to blend the one or more pixels of the first frame with the one or more pixels of the second frame, the one or more processors are caused to:

blend a first pixel of the one or more pixels of the first frame with a corresponding first pixel of the one or more pixels of the second frame to produce the one or more blended pixels of the first blended frame.

22. The non-transitory computer-readable storage medium of claim 20, wherein to blend the one or more pixels of the first frame with the one or more pixels of the second frame, the one or more processors are caused to:

apply a blending function that determines pixel contribution levels as follows:

$$Y_1' = \alpha(X_M^*) + (1-\alpha)Y_1,$$

wherein:
$Y_1'$ represents the first blended frame,
$X_M^*$ represents the first frame with geometrical warping,
$Y_1$ represents the second frame, and
$\alpha$ represents a blending weight.

23. The non-transitory computer-readable storage medium of claim 20, wherein the one or more processors are further caused to:

receive an $n^{th}$ frame from the second camera, the $n^{th}$ frame received subsequent to the second frame; and output the $n^{th}$ frame as a last blended frame of the second camera mode.

24. The non-transitory computer-readable storage medium of claim 23, wherein the one or more processors are further caused to:

activate the second camera prior to the receiving of the first frame by altering a power state of the second camera during the first camera mode to shift power usage from the first camera to the second camera such that the second camera may be utilized during the second camera mode as a primary camera of the second camera mode.

* * * * *